(12) United States Patent
Kurian et al.

(10) Patent No.: US 11,540,140 B2
(45) Date of Patent: Dec. 27, 2022

(54) NEIGHBOR AWARENESS NETWORKING TIME SLOT ALLOCATION

(71) Applicant: Apple Inc., Cupertino, CA (US)

(72) Inventors: Lawrie Kurian, San Jose, CA (US); Yong Liu, Campbell, CA (US); Tashbeeb Haque, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 227 days.

(21) Appl. No.: 16/412,248

(22) Filed: May 14, 2019

(65) Prior Publication Data

US 2019/0357053 A1 Nov. 21, 2019

Related U.S. Application Data

(60) Provisional application No. 62/672,010, filed on May 15, 2018, provisional application No. 62/672,001, filed on May 15, 2018.

(51) Int. Cl.
| | | |
|---|---|---|
| *H04W 16/10* | (2009.01) | |
| *H04W 16/04* | (2009.01) | |
| *H04W 76/10* | (2018.01) | |
| *H04W 28/20* | (2009.01) | |
| *H04W 24/10* | (2009.01) | |
| *H04W 74/08* | (2009.01) | |
| *H04W 72/04* | (2009.01) | |
| *H04W 76/14* | (2018.01) | |
| *H04W 72/02* | (2009.01) | |
| *H04W 84/12* | (2009.01) | |

(52) U.S. Cl.
CPC ........... *H04W 16/10* (2013.01); *H04W 16/04* (2013.01); *H04W 24/10* (2013.01); *H04W 28/20* (2013.01); *H04W 72/02* (2013.01); *H04W 72/0453* (2013.01); *H04W 74/0808* (2013.01); *H04W 76/10* (2018.02); *H04W 76/14* (2018.02); *H04W 84/12* (2013.01)

(58) Field of Classification Search
CPC ..... H04W 16/10; H04W 76/14; H04W 72/02; H04W 16/04; H04W 76/10; H04W 72/0453; H04W 76/23
See application file for complete search history.

(56) References Cited

U.S. PATENT DOCUMENTS

| | | |
|---|---|---|
| 8,060,017 B2 | 11/2011 | Schlicht |
| 8,451,751 B2 | 5/2013 | Challapali |
| 9,681,365 B2 | 6/2017 | Gupta |

(Continued)

FOREIGN PATENT DOCUMENTS

WO WO 2018/080597 A1 5/2018

*Primary Examiner* — Jeffrey M Rutkowski
*Assistant Examiner* — Chae S Lee
(74) *Attorney, Agent, or Firm* — Kowert, Hood, Munyon, Rankin & Goetzel, P.C.

(57) ABSTRACT

One or more wireless stations may operate to configure direct communication with neighboring mobile stations, e.g., direct communication between the wireless stations without utilizing an intermediate access point. A mechanism for wireless stations to learn preferred channels of neighboring wireless stations and to schedule channel sequences within a time period based on the learned channels may include advertisement of preferred channels and adaptation of channel sequences, based on the preferred channels, to maximize bandwidth utilization.

20 Claims, 36 Drawing Sheets

(56) References Cited

U.S. PATENT DOCUMENTS

| | | |
|---|---|---|
| 9,749,376 B2 | 8/2017 | Bologh |
| 10,021,538 B2 | 7/2018 | Rajakarunanayake |
| 10,056,952 B2 | 8/2018 | Ghosh |
| 10,244,459 B2 | 3/2019 | Abraham |
| 10,263,667 B2 | 4/2019 | Zakaria |
| 10,291,586 B2 | 5/2019 | Jia |
| 2015/0319764 A1* | 11/2015 | Damodaran ............ H04W 4/08 370/232 |
| 2016/0165653 A1* | 6/2016 | Liu ....................... H04W 8/005 370/329 |
| 2016/0174225 A1* | 6/2016 | Patil ........................ H04W 4/06 370/329 |
| 2016/0286398 A1* | 9/2016 | Abraham .......... H04W 72/1263 |
| 2016/0309315 A1* | 10/2016 | Shmukler ............. H04W 48/10 |
| 2016/0323870 A1* | 11/2016 | Wei ..................... H04W 72/048 |
| 2016/0353470 A1* | 12/2016 | Liu ..................... H04L 65/4076 |
| 2017/0026874 A1* | 1/2017 | Hassan ............... H04W 28/085 |
| 2017/0311341 A1 | 10/2017 | Patil |
| 2018/0054492 A1 | 2/2018 | Kim |
| 2018/0068358 A1 | 3/2018 | Hoffberg |
| 2018/0139275 A1 | 5/2018 | Abraham |
| 2019/0037418 A1 | 1/2019 | Gunasekara |

\* cited by examiner

FIG. 4A

| Field | Size (Octets) | Description |
|---|---|---|
| FC | 2 | Frame Control field |
| Duration | 2 | Duration value for the beacon frame |
| A1 | 6 | Broadcast Address |
| A2 | 6 | Transmitter MAC address |
| A3 | 6 | Cluster ID identifying the NAN cluster |
| Seq. Ctrl | 2 | Sequence Control field |
| Time Stamp | 8 | Time Stamp of the beacon frame |
| Beacon Interval | 2 | Time units between beacons |
| Capability | 2 | Capability information field |
| NAN IE | Variable | NAN information element |
| FCS | 4 | Frame checksum |

FIG. 4B

| Field | Size | Description |
|---|---|---|
| Category | 1 | IEEE 802.11 public action frame (PAF) or protected dual of PAF |
| Action | 1 | IEEE 802.1 PAF vendor specific |
| OUI | 3 | Wi-Fi Alliance specific OUI |
| OUI Type | 1 | Identifying type and version of NAN |
| NAN attributes | Variable | One or more NAN attributes |

| Attributes | NAN SDF Frames | | | | |
|---|---|---|---|---|---|
| | Publish | | | Subscribe | Follow-up |
| | Data | Ranging | Otherwise | | |
| Master Indication | NO | NO | NO | NO | NO |
| Cluster | NO | NO | NO | NO | NO |
| Service ID List | NO | NO | NO | NO | NO |
| Service Descriptor | YES/M | YES/M | YES/M | YES/M | YES/M |
| NAN Con. Cap. | YES/O | YES/O | YES/O | YES/O | YES/O |
| WLAN Infra | YES/O | YES/O | YES/O | YES/O | YES/O |
| P2P Operation | YES/O | YES/O | YES/O | YES/O | YES/O |
| IBSS | YES/O | YES/O | YES/O | YES/O | YES/O |
| Mesh | YES/O | YES/O | YES/O | YES/O | YES/O |
| Further Service Dis | YES/O | YES/O | YES/O | YES/O | YES/O |
| Further Avail Map | YES/O | YES/O | YES/O | YES/O | YES/O |
| Country Code | YES/O | YES/O | YES/O | YES/O | YES/O |
| Ranging | YES/O | YES/O | YES/O | YES/O | YES/O |
| Cluster Discovery | NO | NO | NO | NO | NO |
| Service Desc. Ext | YES/M | YES/M | YES/O | YES/O | YES/O |
| Device Cap. | YES/M | YES/M | YES/O | YES/O | YES/O |
| NDP | NO | NO | NO | NO | NO |
| NAN Availability | YES/M | YES/M | YES/O | YES/O | YES/O |
| NDC | YES/O | YES/O | YES/O | YES/O | YES/O |
| NDL | NO | NO | NO | NO | NO |
| NDL QoS | NO | NO | NO | NO | NO |
| Unaligned Sched. | YES/O | YES/O | YES/O | YES/O | YES/O |
| Ranging Info. | NO | YES/M | NO | NO | YES/O |
| Ranging Setup | NO | NO | NO | NO | NO |
| FTM Rang. Rep. | NO | NO | NO | NO | NO |
| Element Container | YES/O | YES/O | YES/O | YES/O | YES/O |
| Ex. WLAN Infra. | YES/O | YES/O | YES/O | YES/O | YES/O |
| Ex. P2P Operation | YES/O | YES/O | YES/O | YES/O | YES/O |
| Ex. IBSS | YES/O | YES/O | YES/O | YES/O | YES/O |
| Ex. Mesh | YES/O | YES/O | YES/O | YES/O | YES/O |
| Cipher Suit Info. | YES/O | YES/O | YES/O | YES/O | YES/O |
| Security Con. Info. | YES/O | YES/O | YES/O | YES/O | YES/O |
| Shared-Key Desc. | NO | NO | NO | NO | NO |
| Public Availability | YES/O | YES/O | YES/O | YES/O | YES/O |
| Vendor Specific | YES/O | YES/O | YES/O | YES/O | YES/O |

FIG. 4C

| Field | Size | Description |
|---|---|---|
| Category | 1 | IEEE 802.11 public action frame (PAF) or protected dual of PAF |
| Action | 1 | IEEE 802.1 PAF vendor specific |
| OUI | 3 | Wi-Fi Alliance specific OUI |
| OUI Type | 1 | Identifying type and version of NAN |
| OUI Subtype | 1 | Identifying type of NAN action frame |
| Information Content | variable | Fields and/or attributes for specific NAN action frames |

FIG. 4D

| Levels | Bandwidth | Allocation | Min Latency |
|---|---|---|---|
| Tier 1 | 12.5% | 4 of 32 slots | ~450 msecs |
| Tier 2 | 26% | 8 of 32 slots | ~386 msecs |
| Tier 3 | 50% | 16 of 32 slots | ~268 msecs |
| Tier 4 | 75% | 24 of 32 slots | ~130 msecs |
| Tier 5 | 100% | 32 of 32 slots | ~2 msecs |

| Levels | Bandwidth | Allocation |
|---|---|---|
| Tier 1 | 12.5% | 4 of 32 slots |
| Tier 2 | 25% | 8 of 32 slots |
| Tier 3 | 50% | 16 of 32 slots |
| Tier 4 | 75% | 24 of 32 slots |
| Tier 5 | 100% | 32 of 32 slots |

FIG. 10

| | Tier | Samples | Tx Packets | Rx Packets | Next Tier |
|---|---|---|---|---|---|
| 930 | 1 | 1 DW | >= 1 | >= 1 | 3 |
| 932 | 2 | 1 DW | >= 64 | >= 64 | 3 |
| 934 | 3 | 1 DW | >= 128 | >= 128 | 4 |
| 936 | 4 | 1 DW | >= 266 | >= 266 | 5 |
| 938 | 5 | 1 DW | >= 266 | >= 266 | 5 |

FIG. 11

| | Tier | Samples | Tx Packets | Rx Packets | Next Tier |
|---|---|---|---|---|---|
| 920 | 1 | 2 DW | <= 0 | <= 0 | 1 |
| 922 | 2 | 4 DW | <= 0 | <= 0 | 1 |
| 924 | 3 | 4 DW | <= 64 | <= 64 | 2 |
| 926 | 4 | 3 DW | <= 128 | <= 128 | 3 |
| 928 | 5 | 3 DW | <= 266 | <= 266 | 4 |

FIG. 12

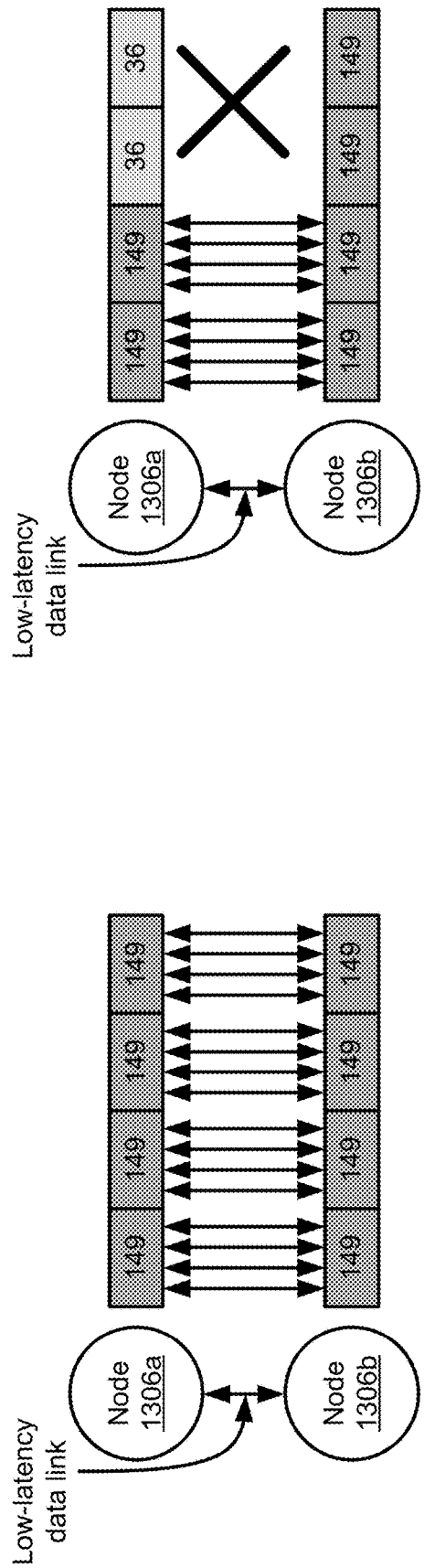
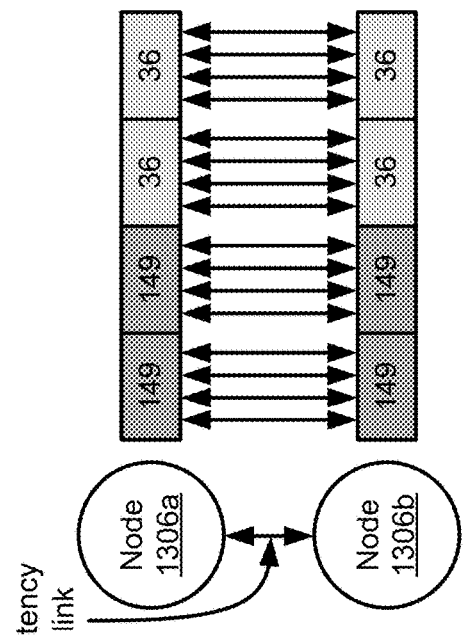
FIG. 13A
FIG. 13B
FIG. 13C

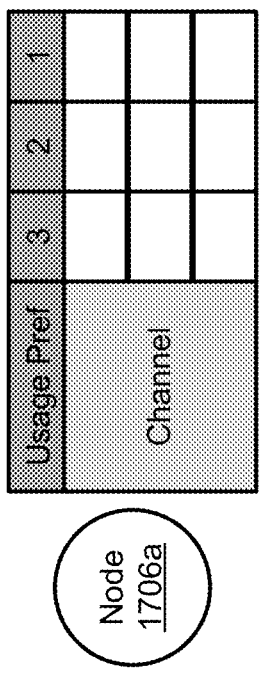
FIG. 17A
FIG. 17B
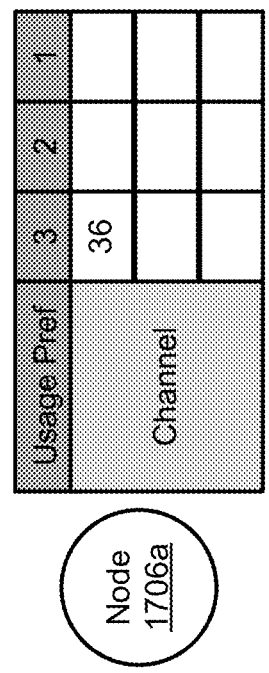
FIG. 17C
FIG. 17D

NEIGHBOR AWARENESS NETWORKING TIME SLOT ALLOCATION

PRIORITY DATA

This application claims benefit of priority to U.S. Provisional Application Ser. No. 62/672,001, titled "Neighbor Awareness Networking Preferred Channel Learning", filed May 15, 2018, by Lawrie Kurian, Yong Liu, and Tashbeeb Haque, and to U.S. Provisional Application Ser. No. 62/672,010, titled "Neighbor Awareness Networking Time Slot Allocation", filed May 15, 2018, by Lawrie Kurian, Yong Liu, and Tashbeeb Haque, each of which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems, Wi-Fi mobile stations are able to communicate directly with each other without using an intermediate access point. However, improvements in the operation of such devices are desired, such as in the setup and coordination of the communication between such devices.

SUMMARY

Some embodiments described herein relate to systems and methods for peer wireless stations (e.g., wireless stations configured to communicate with neighboring wireless stations without utilizing an intermediate access point) to learn preferred channels of peer devices and to allocate channels based on the learned preferred channels.

Some embodiments relate to a wireless station that includes one or more antennas, one or more radios, and one or more processors coupled (directly or indirectly) to the radios. At least one radio is configured to perform Wi-Fi communications, e.g., via a Wi-Fi interface. The wireless station may perform voice and/or data communications, as well as any or all of the methods described herein.

In some embodiments, one or more wireless stations operate to configure direct communication with one or more neighboring mobile stations, e.g., direct communication between the wireless stations without utilizing an intermediate access point. Embodiments of the disclosure relate to a mechanism for peer devices to advertise and learn preferred channels. Embodiments of the disclosure further relate to a mechanism for peer devices to adapt channel sequences to maximize bandwidth utilization.

In some embodiments, the communications may be performed via a peer-to-peer wireless communications protocol, such as Neighbor Awareness Networking (NAN). Thus, embodiments of the disclosure also relate to NAN devices advertising and learning preferred channels as well as adapting channel sequences to maximize bandwidth utilization.

In some embodiments, a wireless station may be configured to initiate a negotiation of a peer-to-peer data session with a neighboring wireless station using a first bandwidth allocation, and, upon establishment of the peer-to-peer data session with the neighboring wireless station, transitioning to a second bandwidth allocation, wherein the second bandwidth allocation is based on a type of traffic for the peer-to-peer data session. Further, the wireless station may be configured to monitor, for one or more time periods, data traffic metrics associated with the peer-to-peer data session. In some embodiments, if at least two data traffic metrics satisfy first criteria, the wireless station may be configured to transition to a third bandwidth allocation, where the third bandwidth allocation allocates less bandwidth than the second bandwidth allocation. In some embodiments, if at least one data traffic metric satisfies second criteria, the wireless station may be configured to transition to a fourth bandwidth allocation, wherein the fourth bandwidth allocation allocates bandwidth greater than or equal to the bandwidth allocated based on the second bandwidth allocation.

In some embodiments, a wireless station may be configured to initiate a negotiation of a peer-to-peer data session with a neighboring wireless station and, upon establishment of the peer-to-peer data session with the neighboring wireless station, transmit first channel preferences to the neighboring wireless station and receive, from the neighboring wireless station, second channel preferences. Further, the wireless station may be configured to schedule, for a first time period comprising one or more time blocks a first preferred channel for a first time block of one or more time blocks, where the first preferred channel is based, at least in part, on the first channel preferences, and a second preferred channel for a second time block of the one or more time blocks, where the second preferred channel is based, at least in part, on the second channel preferences.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 4A illustrates an example format of a synchronization/discovery beacon frame, according to some embodiments.

FIG. 4B illustrates an example format of a service discovery frame (SDF), according to some embodiments.

FIG. 4C illustrates an example format of a NAN attribute field, according to some embodiments.

FIG. 4D illustrates an example format of an action frame, according to some embodiments.

FIG. 10 illustrates additional examples of bandwidth allocations for associated bandwidth tiers, according to some embodiments.

FIG. 11 illustrates example criteria for transitioning from lower bandwidth tiers to higher bandwidth tiers, according to some embodiments.

FIG. 12 illustrates example criteria for transition from higher bandwidth tiers to lower bandwidth tiers, according to some embodiments.

FIG. 13A illustrates an example of 100 percent bandwidth allocation for a low latency data link between peer devices.

FIG. 13B illustrates an example of a low latency data link in which peer devices have differing preferred channel preferences.

FIG. 13C illustrates an example of peer devices adapting to channel preferences, according to some embodiments.

FIGS. 17A-B illustrate an example of a usage preference table and time block channel allocation for a device not associated with an access point, according to some embodiments.

FIGS. 17C-D illustrate an example of a usage preference table and time block channel allocation for a device associated with an access point, according to some embodiments.

Figure 1:
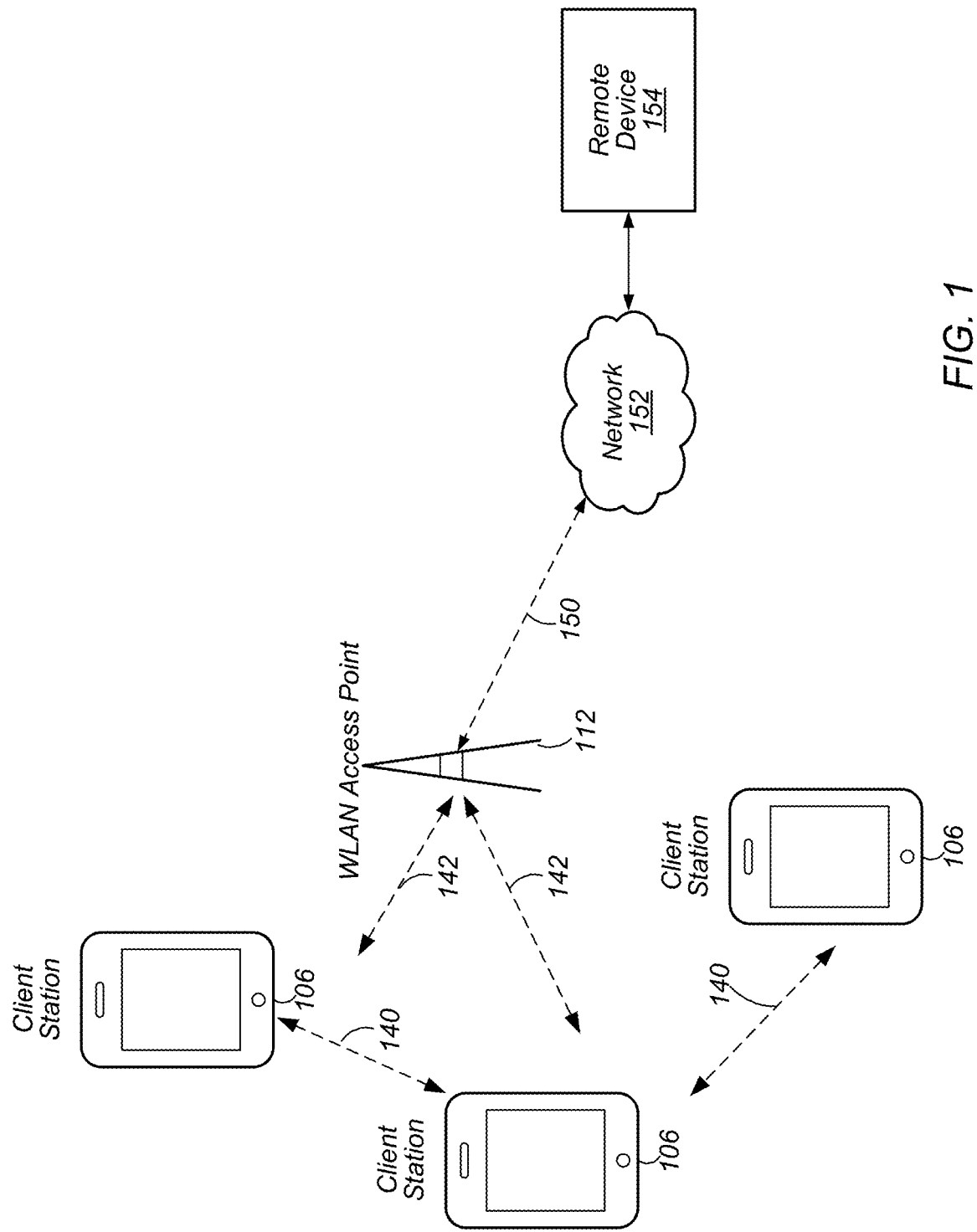
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
SInf-Seg: Service Information Segment
NW-Req: to request the peer NAN device to present in NW CaOp: Capabilities and Operations elements
Security: Security preferences
SessionInfo: advertisement_id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™ etc. Various other types of devices would fall into this category if they include Wi-Fi or both cellular and Wi-Fi communication capabilities, such as laptop computers (e.g., MacBook™) portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™ Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

WI-FI—The term "WI-FI" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "WI-FI". A WI-FI(WLAN) network is different from a cellular network.

BLUETOOTH™—The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short-range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (e.g., meaning having the potential to), rather than the mandatory sense (e.g., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods to initiate a negotiation of a peer-to-peer data session with a neighboring wireless station using a first bandwidth allocation, and, upon establishment of the peer-to-peer data session with the neighboring wireless station, transitioning to a second bandwidth allocation, wherein the second bandwidth allocation is based on a type of traffic for the peer-to-peer data session. Further, the wireless device 106 may be configured to monitor, for one or more time periods, data traffic metrics associated with the peer-to-peer data session. In some embodiments, if at least two data traffic metrics satisfy first criteria, the wireless device 106 may be configured to transition to a third bandwidth allocation, where the third bandwidth allocation allocates less bandwidth than the second bandwidth allocation. In some embodiments, if at least one data traffic metric satisfies second criteria, the wireless device 106 may be configured to transition to a fourth bandwidth allocation, wherein the fourth bandwidth allocation allocates bandwidth greater than or equal to the bandwidth allocated based on the second bandwidth allocation.

In some embodiments, a wireless device 106 may be configured to perform methods to initiate a negotiation of a peer-to-peer data session with a neighboring wireless station and, upon establishment of the peer-to-peer data session with the neighboring wireless station, transmit first channel preferences to the neighboring wireless station and receive, from the neighboring wireless station, second channel preferences. Further, the wireless device 106 may be configured to schedule, for a first time period comprising one or more time blocks a first preferred channel for a first time block of one or more time blocks, where the first preferred channel is based, at least in part, on the first channel preferences, and a second preferred channel for a second time block of the one or more time blocks, where the second preferred channel is based, at least in part, on the second channel preferences.

Figure 2:
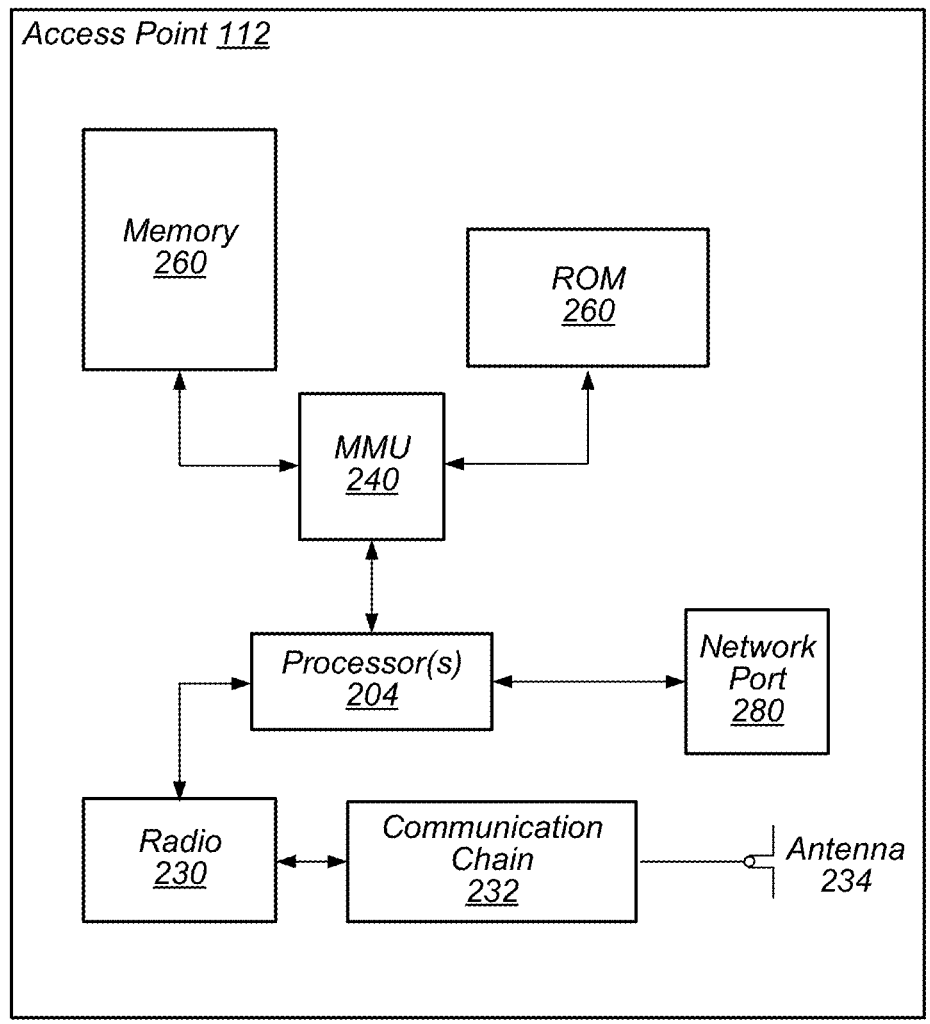
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 that may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods to initiate a negotiation of a peer-to-peer data session with a neighboring wireless station using a first bandwidth allocation, and, upon establishment of the peer-to-peer data session with the neighboring wireless station, transitioning to a second bandwidth allocation, wherein the second bandwidth allocation is based on a type of traffic for the peer-to-peer data session. Further, the AP 112 may be configured to monitor, for one or more time periods, data traffic metrics associated with the peer-to-peer data session. In some embodiments, if at least two data traffic metrics satisfy first criteria, the AP 112 may be configured to transition to a third bandwidth allocation, where the third bandwidth allocation allocates less bandwidth than the second bandwidth allocation. In some embodiments, if at least one data traffic metric satisfies second criteria, the AP 112 may be configured to transition to a fourth bandwidth allocation, wherein the fourth bandwidth allocation allocates bandwidth greater than or equal to the bandwidth allocated based on the second bandwidth allocation.

In some embodiments, an AP 112 may be configured to perform methods to initiate a negotiation of a peer-to-peer data session with a neighboring wireless station and, upon establishment of the peer-to-peer data session with the neighboring wireless station, transmit first channel preferences to the neighboring wireless station and receive, from the neighboring wireless station, second channel preferences. Further, the AP 112 may be configured to schedule, for a first time period comprising one or more time blocks a first preferred channel for a first time block of one or more time blocks, where the first preferred channel is based, at least in part, on the first channel preferences, and a second preferred channel for a second time block of the one or more time blocks, where the second preferred channel is based, at least in part, on the second channel preferences.

Figure 3:
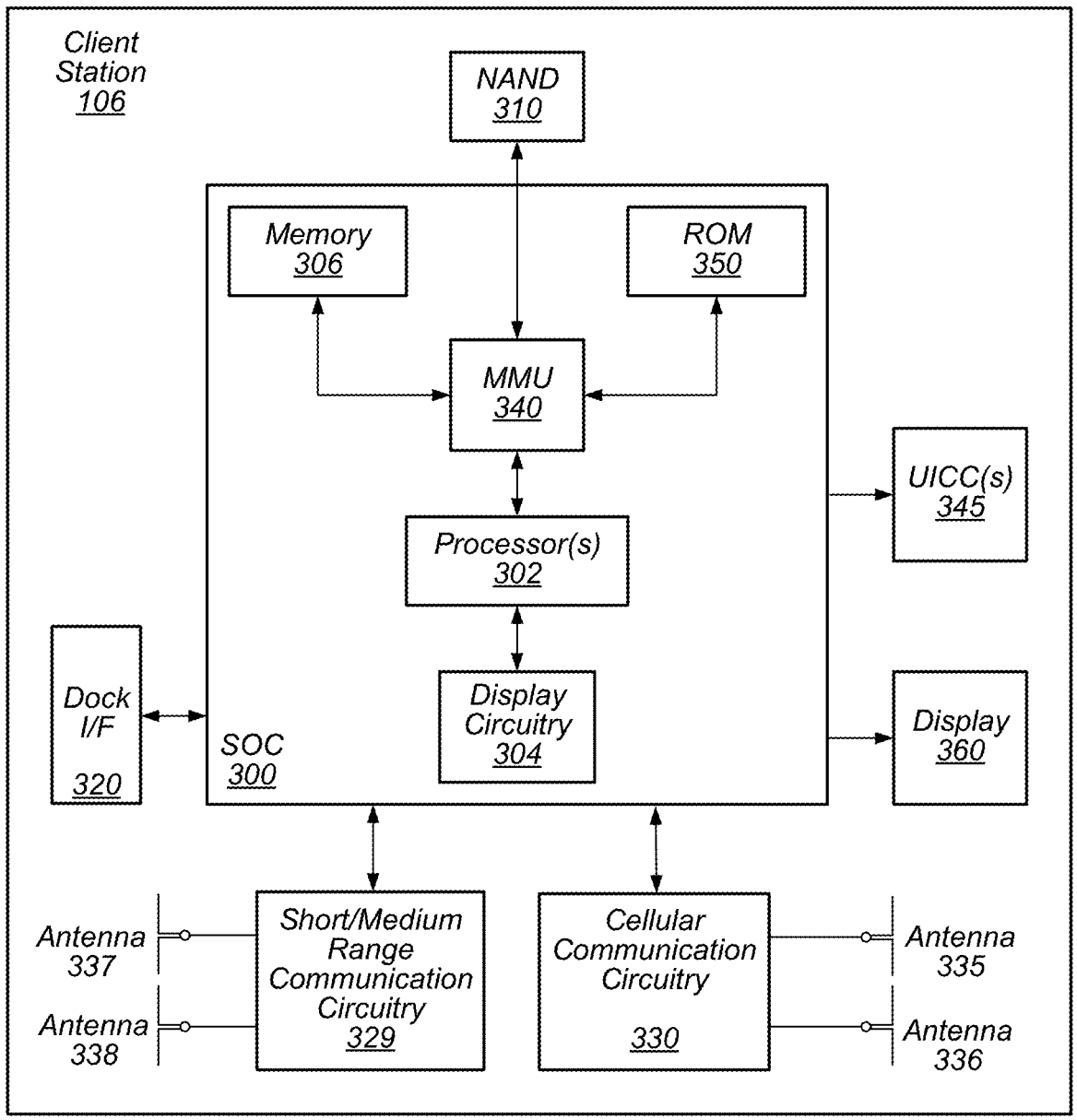
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329

(e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods to initiate a negotiation of a peer-to-peer data session with a neighboring wireless station using a first bandwidth allocation, and, upon establishment of the peer-to-peer data session with the neighboring wireless station, transitioning to a second bandwidth allocation, wherein the second bandwidth allocation is based on a type of traffic for the peer-to-peer data session. Further, the wireless station 106 may be configured to monitor, for one or more time periods, data traffic metrics associated with the peer-to-peer data session. In some embodiments, if at least two data traffic metrics satisfy first criteria, the wireless station 106 may be configured to transition to a third bandwidth allocation, where the third bandwidth allocation allocates less bandwidth than the second bandwidth allocation. In some embodiments, if at least one data traffic metric satisfies second criteria, the wireless station 106 may be configured to transition to a fourth bandwidth allocation, wherein the fourth bandwidth allocation allocates bandwidth greater than or equal to the bandwidth allocated based on the second bandwidth allocation.

In some embodiments, a wireless station 106 may be configured to perform methods to initiate a negotiation of a peer-to-peer data session with a neighboring wireless station and, upon establishment of the peer-to-peer data session with the neighboring wireless station, transmit first channel preferences to the neighboring wireless station and receive, from the neighboring wireless station, second channel preferences. Further, the wireless station 106 may be configured to schedule, for a first time period comprising one or more time blocks a first preferred channel for a first time block of one or more time blocks, where the first preferred channel is based, at least in part, on the first channel preferences, and a second preferred channel for a second time block of the one or more time blocks, where the second preferred channel is based, at least in part, on the second channel preferences.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short-range wireless communication circuitry 329 may each include one or more processing elements. In other words, one or more processing elements may be included in cellular communication circuitry 330 and also in short range wireless communication circuitry 329. Thus, each of cellular communication circuitry 330 and short-range wireless communication circuitry 329 may include one or more integrated circuits (ICs) that are configured to perform the functions of cellular communication circuitry 330 and short-range wireless communication circuitry 329, respectively. In addition, each integrated circuit may include circuitry (e.g., first circuitry, second circuitry, etc.) configured to perform the functions of cellular communication circuitry 330 and short-range wireless communication circuitry 329.

Peer-to-Peer Frame Formats

In some embodiments, Wi-Fi devices (e.g., client station 106) may be able to communicate with each other in a peer to peer manner, e.g., without the communications going through an intervening access point. In some embodiments, devices may exchange one or more management frames, e.g., such as synchronization/discovery beacon frames, service discovery frames (SDFs), and/or action frames, in order to synchronize, advertise, solicit, and/or negotiate a peer-to-peer data session, such as a NAN datapath and/or a NAN datalink. In some embodiments, particular management frame formats (e.g., synchronization/discovery beacon frame formats, SDF formats, and/or action frame formats) may be implemented to transport information associated with embodiments disclosed herein.

For example, as illustrated by FIG. 4A, a synchronization/discovery beacon frame format (e.g., as specified by NAN 2.0 and later versions of NAN) may include fields such as a frame control (FC) filed, a duration field, multiple address fields (e.g., A1-A3), a sequence control field, a time stamp field, a beacon interval field, a capability information field, a NAN information element (IE) field, and/or a frame checksum (FCS) field. The frame control field, duration field, sequence control field, time stamp field, beacon interval field, capability field, and FCS field may be defined by IEEE 802.11. Note that for synchronization beacons, the beacon interval field may be set to 512 TUs, which may correspond to a time interval between consecutive starts of discovery windows. In addition, for discovery beacons, the beacon interval field may be set to 100 TUs, which may correspond to an average time between consecutive discovery beacon transmissions by a device in a master role. Addresses may include a broadcast address (A1), a transmitter medium access control (MAC) address (A2), and a cluster identifier address (A3). In some embodiments, the NAN IE may be vendor specific and may be configured to transport information associated with embodiments disclosed herein.

As another example, as illustrated by FIG. 4B, a service discovery frame format (e.g., as specified by NAN 2.0 and later versions of NAN) may include one or more fields, including a category field, an action field, an organizationally unique identifier (OUI) field, an OUI type field, and/or a NAN attributes field. In some embodiments, information associated with embodiments disclosed herein may be transported via the NAN attributes field. In some embodiments, information associated with embodiments disclosed herein may be transported via the OUI field and/or the OUI type field.

Further, as illustrated by FIG. 4C, the NAN attribute field (e.g., as specified by NAN 2.0 and later versions of NAN) includes multiple fields that may be used to implement features of embodiments disclosed herein. For example, in some embodiments, information associated with embodiments disclosed herein may be transported via any of (or any combination of) attributes included in the NAN attribute field. For example, in some embodiments, the vendor specific attribute may be used to transport information associated with embodiments disclosed herein. As another example, the further availability map attribute may be used to transport information associated with embodiments disclosed herein. As shown, the NAN attribute field may contain (or included) different attributes based on a type of NAN SDF frame. For example, a publish SDF frame for data transmission may include both mandatory (M) and optional (O) attributes that differ from a publish SDF frame for ranging and/or other purposes (e.g., "Otherwise"). Similarly, a subscribe SDF frame may include differing attributes as compared to a follow-up SDF and/or the various publish SDF frames. Thus, as a further example, various configurations of a NAN attribute may be used to transport information associated with embodiments disclosed herein.

As yet a further example, as illustrated by FIG. 4D, an action frame format (e.g., as specified by NAN 2.0 and later versions of NAN) may include one or more fields, including a category field, an action field, an OUI field, an OUI type field, an OUI subtype field and/or an information content field. In some embodiments, information associated with embodiments disclosed herein may be transported via the information content field. In some embodiments, information associated with embodiments disclosed herein may be transported via the OUI field, the OUI type field, and/or the OUI subtype field.

Wi-Fi Peer to Peer Communication Protocols

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability beyond discovery windows.

The NAN protocol includes two aspects: 1) synchronization and discovery (NAN 1.0) and 2) datapath transmission (NAN 2.0). The NAN protocol also may incorporate additional aspects. NAN 1.0 describes methods for NAN protocol synchronization and discovery. After two wireless stations have discovered each other (per NAN 1.0) they may implement a procedure to setup a NAN datapath between them so that they can communicate. After this, the two wireless stations arrange for a common datapath negotiation window so that they can negotiate capabilities, synchronization requirements, and/or exchange further service information (e.g., per NAN 2.0). The datapath negotiation window is a time window that enables two wireless stations to communicate with each other so that they can negotiate capabilities and/or synchronization requirements, and exchange further service information. Once the datapath negotiation window has been established and NAN datapath setup has been performed, the wireless stations may perform datapath synchronization to help ensure that the two stations stay synchronized with each other for communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Embodiments described herein further define methods (and/or mechanisms) for a wireless station (including, but not limited to, a NAN device) to learn preferred channels of peer devices and to allocate channels based on the learned preferred channels.

Peer-to-Peer Adaptive Time Slot Allocation

In some implementations of NAN, a NAN datapath may require time slots and channels to be allocated for data transfer between peer wireless devices. In other words, time slots and channels may be allocated for data transfer between peer wireless devices. In some implementations, the allocation may result in a fixed (or static) schedule. However, such a schedule may be inefficient. For example, such a schedule may cause unnecessary power consumption due to under utilization of time slots. In other words, if too many time slots are not utilized, the wireless devices may consume power to be available (e.g., for transmission or reception of data) during the time slots that are not used and/or not completely utilized for data transmission. In addition, such a schedule may not be adaptable to bursty (e.g., intermittent) data traffic. Further, in some implementations, only overlapping time slots may be utilized in an asymmetric schedule between peers. Thus, in some embodiments as described herein, peer wireless devices may adapt time slot and channel allocations synchronously.

Figure 5:
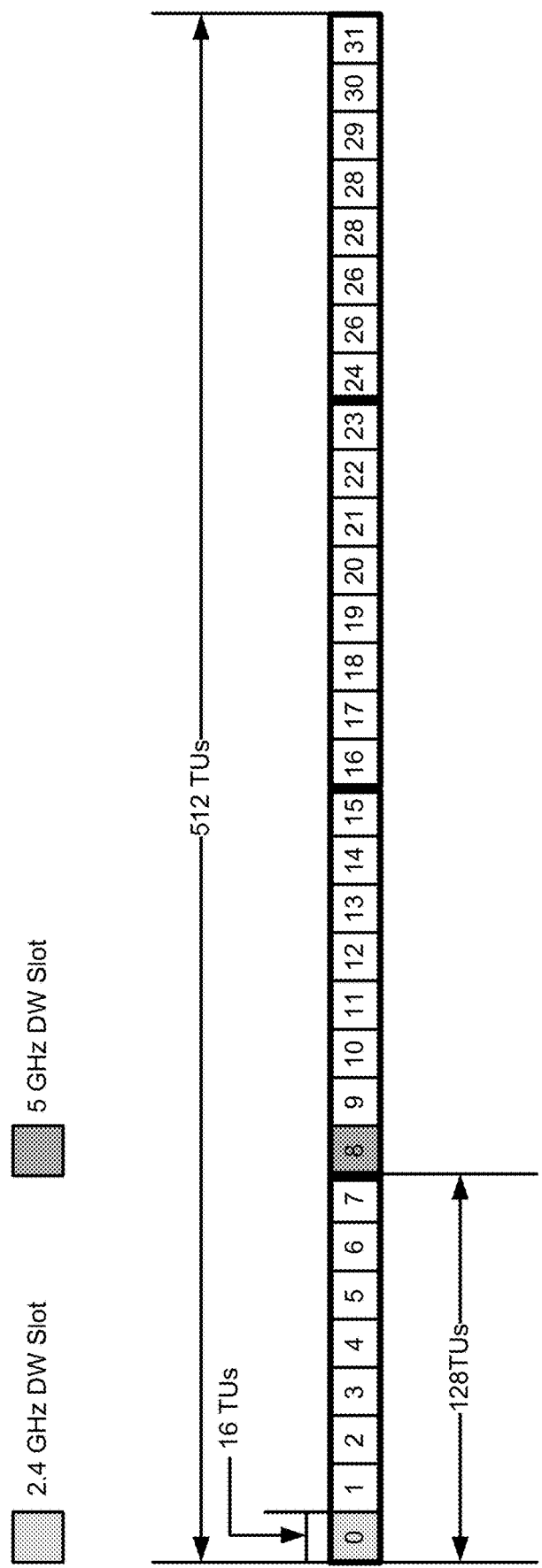
FIG. 5 illustrates an example of a time period (or discovery window interval), according to some embodiments.

In some embodiments, as further illustrated by FIG. 5, a time period (or discovery window interval) may be defined as 512 time units (TUs) and may be divided into equal time blocks. Note that a time unit may be defined as 1024 microseconds (1.024 milliseconds) or approximately 1 millisecond. For example, as shown in FIG. 5, a time period may be divided into 4 time blocks of 128 TUs each. Note that each time block may be further subdivided into time slots of 16 TUs. Thus, a 128 TU time block may include 8 16 TU time slots. In some embodiments, a first time slot of a first time block of the time period may be assigned as a discovery window for a 2.4 GHz band. In other words, a time slot may be pre-defined (or pre-allocated) for a social channel within the 2.4 GHz band. In some embodiments, a first time slot of a second time block of the time period may be assigned as a discovery window for a 5 GHz band. In other words, a time slot may be pre-defined (or pre-allocated) for a social channel within the 5 GHz band. In some embodiments, a number of time blocks may be increase as the time period is increased. For example, a 1024 TU time period may include 8 time blocks, a 2048 TU time period may include 16 time blocks, a 4096 TU time period may include 32 time blocks, an 8192 TU time period may include 64 time blocks, and so forth.

Figure 6A:
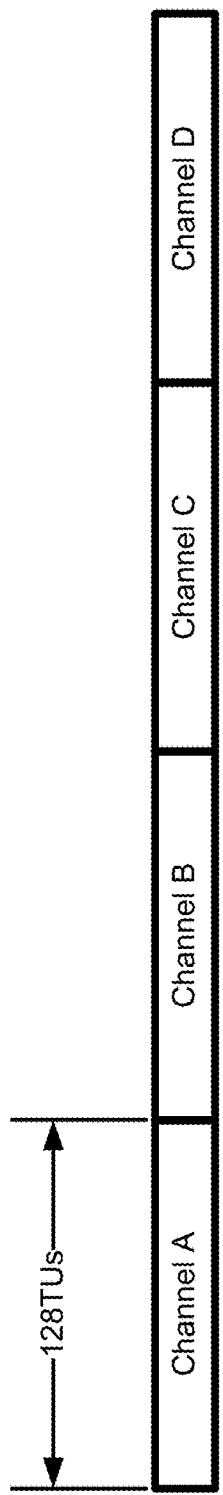
FIGS. 6A-C illustrate examples of time block channel assignments, according to some embodiments.
Figure 6B:
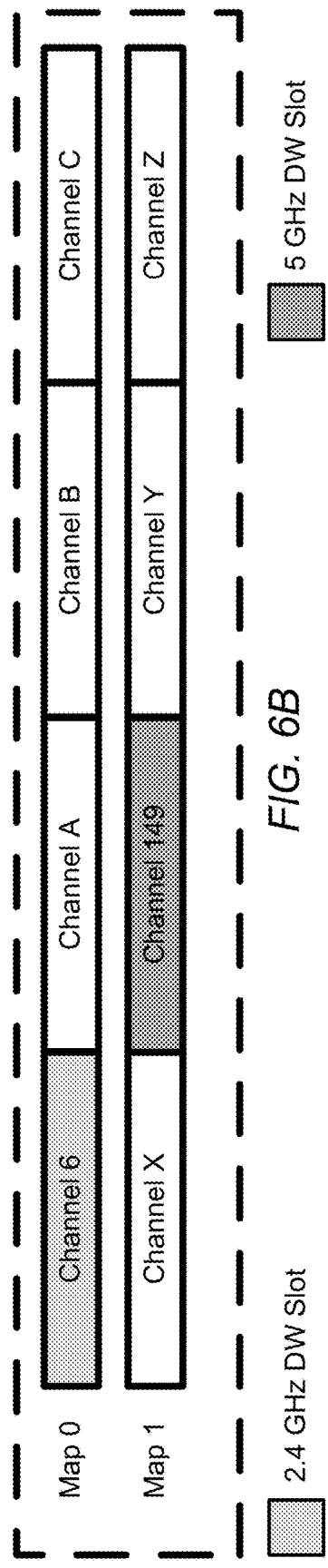
Figure 6C:
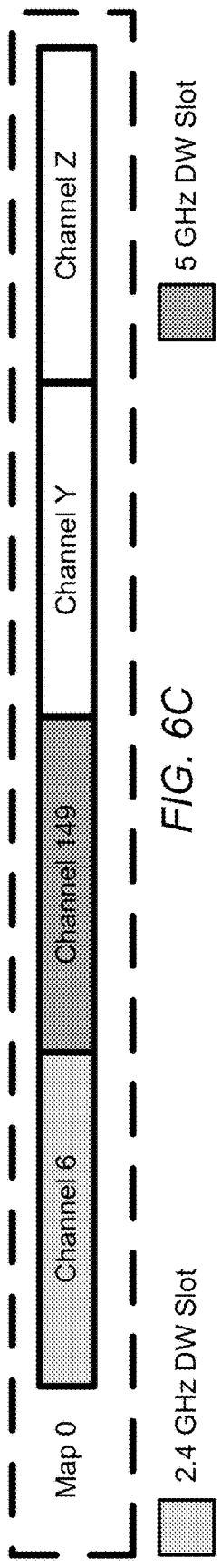

In some embodiments, as further illustrated by FIGS. 6A-6C, each time block within a time period may be assigned a channel. For example, in some embodiments, each time block may be assigned the same channel or each time block could have a different channel. In some embodiments, as illustrated by FIG. 6A, for a single radio wireless device, such as client station 106, a first time block in a time period may be channel A, a second time block may be assigned channel B, a third time block may be assigned channel C, and a fourth time block may be assigned a channel D. In some embodiments, as further illustrated by FIG. 6B, if a discovery window (DW) is scheduled for one of the time blocks (e.g., as illustrated by FIG. 5), then a DW social channel (e.g., channel 6 for a 2.4 GHz band and channel 149 for 5 GHz band) may be assigned to that time block. Thus, as illustrated, for a multi-radio device, such as client station 106, an allocation for a first radio may include assignment of channel 6 (2.4 GHz band social channel) for a time block corresponding to the DW for the 2.4 GHz band, followed by time blocks assigned with channels A, B, and C, respectively. Similarly, a second radio may include assignment of channel X for a first time block, channel 149 (5 GHz band social channel) for a second time block, where the second time block corresponds to the DW for the 5 GHz band, and channels Y and Z for a third and a fourth time block, respectively. Further, as illustrated by FIG. 6C, for a single radio device, an allocation for a radio may include channel 6 for a first time block, where the first time block corresponds to the DW for the 2.4 GHz band, channel 149 for a second time block, where the second time block corresponds to the DW for the 5 GHz band, and channels Y and Z for a third and a fourth time block, respectively. Note that although FIGS. 6A-6C illustrate DWs occurring in consecutive time blocks at the beginning of a time period, other embodiments are envisioned in which the DWs are not in consecutive time blocks and/or do not occur at the beginning of the time period.

Figures 7, 8:
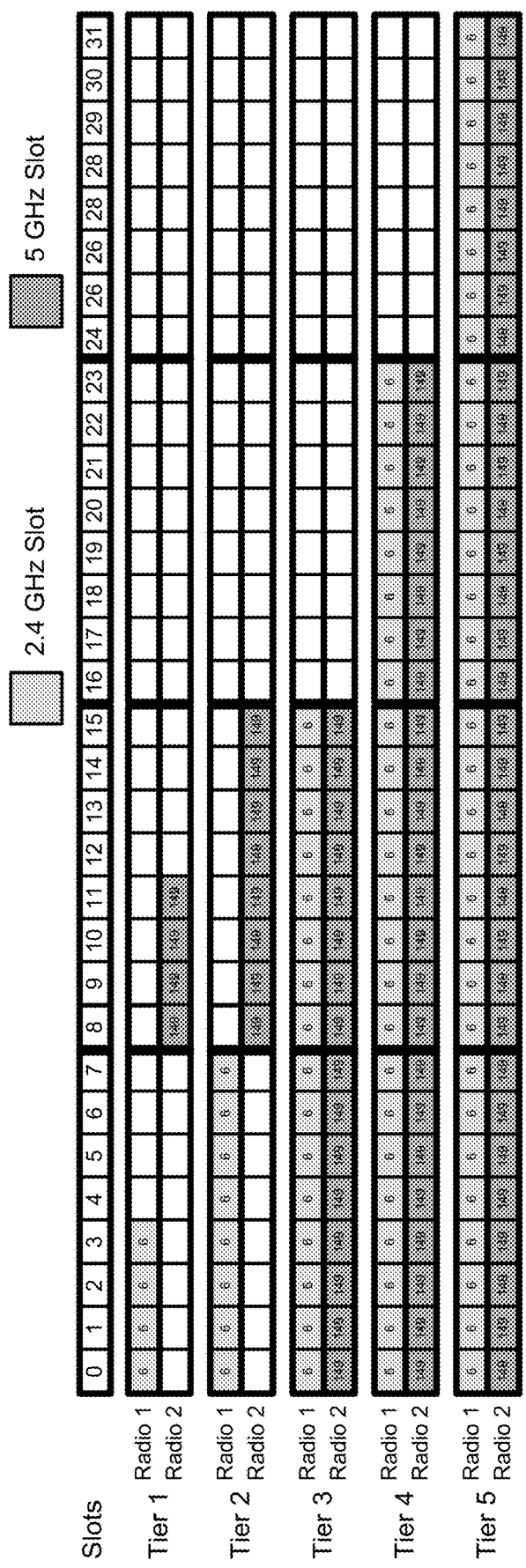
FIG. 7 illustrates examples of time slot allocations for various bandwidth tiers, according to some embodiments.
FIG. 8 illustrates examples of bandwidth allocations for associated bandwidth tiers, according to some embodiments.

In some embodiments, a time slot allocation (e.g., for a given time period) may be classified into tiers. In some embodiments, a highest tier may correspond to a maximum bandwidth allocation and a minimum tier may correspond to a minimum bandwidth allocation. For example, as illustrated by FIG. 7, a first tier (e.g., Tier 1) may correspond to a minimum tier and/or minimum bandwidth allocation. As shown, Tier 1 for a first radio of a wireless device (e.g., such as client station 106) may include an allocation of 4 time slots for a first channel (e.g., social channel 6) in a first time block (e.g., that includes 8 time slots) and Tier 1 for a second radio of the wireless device may include 4 time slots for a second channel (e.g., social channel 149) in a second time block (e.g., that includes 8 time slots). Note that the remainder of the time slots and/or time blocks may not be allocated. Thus, as illustrated by the table of FIG. 8, a Tier 1 classification of the time slot allocation may correspond to 12.5% bandwidth for each radio. Further, a second tier (e.g., Tier 2) may correspond to 25% bandwidth for each radio. Thus, Tier 2 for the first radio may include an allocation of 8 time slots for the first channel in the first time block with the remaining time slots in the remaining time blocks of the time period unallocated. Similarly, Tier 2 for the second radio may include an allocation of 8 time slots for the second channel in the second time block with the remaining time slots in the other time blocks of the time period unallocated.

In addition, a third tier (e.g., Tier 3) may correspond to 50% bandwidth for each radio. Thus, Tier 3 for the first radio may include an allocation of 16 time slots for the first channel in the first two time blocks with the remaining time slots in the remaining time blocks of the time period unallocated. Similarly, Tier 3 for the second radio may include an allocation of 16 time slots for the second channel in the first two time blocks with the remaining time slots in the other time blocks of the time period unallocated. A fourth tier (e.g., Tier 4) may correspond to 75% bandwidth for each radio. Thus, Tier 4 for the first radio may include an allocation of 24 time slots for the first channel in the first three time blocks with the remaining time slots in the remaining time block of the time period unallocated. Similarly, Tier 4 for the second radio may include an allocation of 24 time slots for the second channel in the first three time blocks with the remaining time slots in the other time block of the time period unallocated.

In addition, a fifth tier (e.g., Tier 5) may correspond to a highest tier and/or a maximum bandwidth allocation (e.g., 100%). Thus, Tier 5 for the first radio may include an allocation of all (e.g., 32) time slots for the first channel across all of the time blocks of the time period and Tier 5 for the second radio may include an allocation of all (e.g., 32) time slots for the second channel across all of the time blocks of the time period. Note that although the examples of FIGS. 7 and 8 illustrate a 512 TU time period with 4 time blocks, the tier classification can be expanded to include longer time periods and/or different a different number of time blocks. Further, although the examples of FIGS. 7 and 8 show allocation to a single channel for each radio, the tier classification described herein can be adapted to included multiple channels for each radio.

In some embodiments, based on data traffic metrics (e.g., such as number of transmitted data packets within a time period, number of received data packets within a time period, packet error rate (PER), and/or clear channel assessment (CCA)), a time schedule (e.g., time slot allocation) may adapt through various allocation tiers. In some embodiments, peer devices (e.g., devices involved in a peer-to-peer data transmission session, such as a NAN datapath) may sample data traffic metrics during discovery windows such that the peer devices sample the data traffic substantially concurrently (e.g., during a similar and/or same time period). In some embodiments, upgrading (e.g., transitioning) to a higher tier (e.g., an increase in bandwidth allocation for the peer-to-peer data transmission session) may be more aggressive as compared to downgrading (e.g., transitioning) to a lower tier (e.g., a decrease in bandwidth allocation for the peer-to-peer data transmission session), which may be more conservative. In other words, a threshold for increasing bandwidth allocation may be less restrictive as compared to a threshold for decreasing bandwidth allocation. In some embodiments, sampling period (e.g., a number of discovery windows between data traffic metric samples) may be based, at least in part, on a current tier allocation. In some embodiments, for a low latency traffic type, peers participating in a low latency peer-to-peer data transmission session may directly jump to a highest tier upon initiation of the peer-to-peer data transmission session (e.g., upon successful datapath negotiation). In some embodiments, subsequent to a tier transition, a new (and/or updated) availability schedule may be transmitted (e.g., broadcasted) to neighboring peer devices. For example, in some embodiments, the new (and/or updated) availability may be transmitted over the air in a schedule update NAN action frame and/or in a NAN availability attribute in a NAN beacon and/or NAN service discovery frame (SDF).

Figure 9:
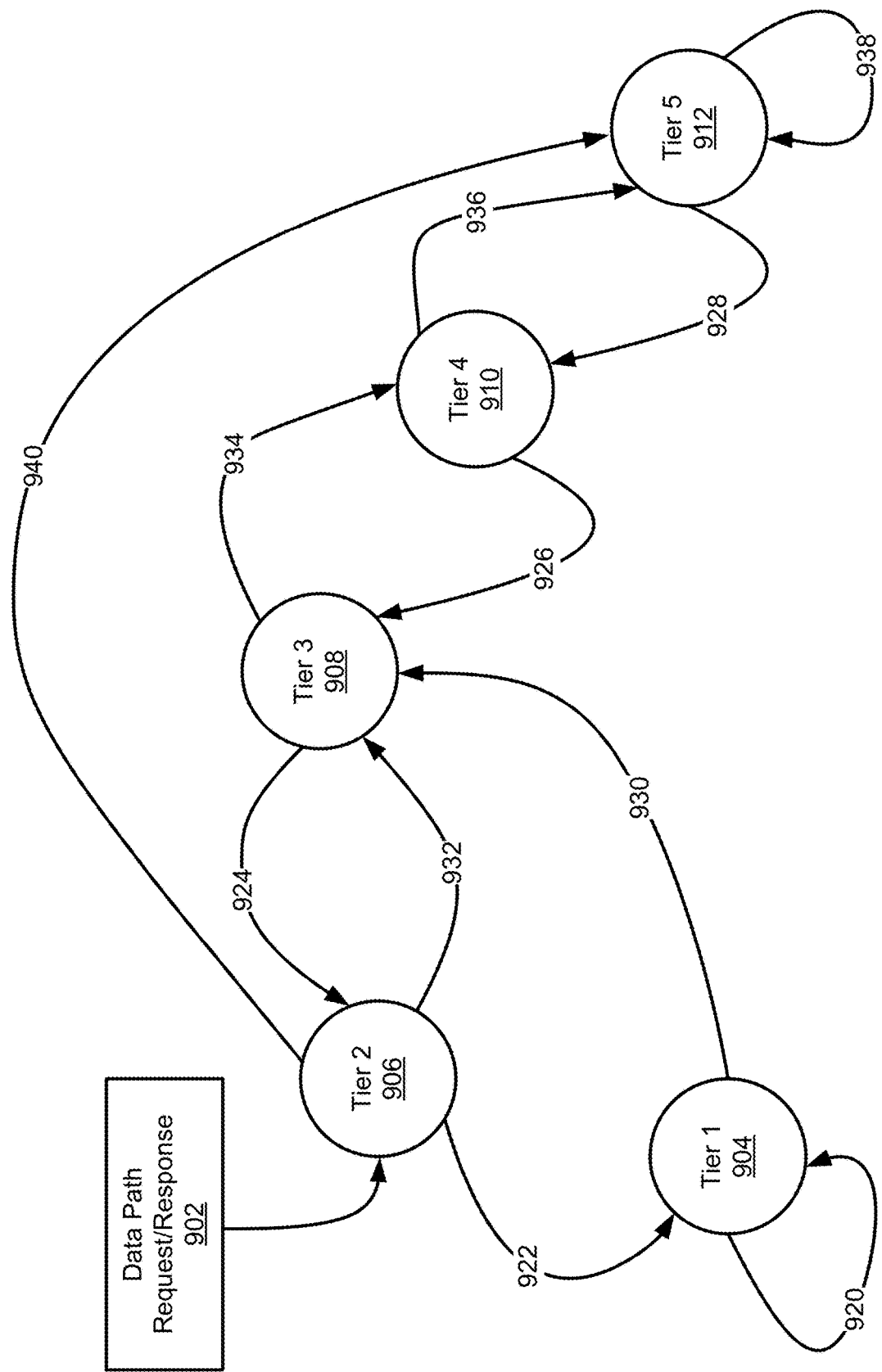
FIG. 9 illustrates an example state diagram of an example of a method for transitioning between tier allocations during a peer-to-peer data transmission session, according to some embodiments.

FIG. 9 illustrates an example state diagram of an example of a method for transitioning between tier allocations during a peer-to-peer data transmission session, according to some embodiments. The state diagram shown in FIG. 9 may be used in conjunction with (and/or implemented by) any of the systems or devices shown in the above Figures, among other devices. For example, a processor and/or processing element of a device shown in the above Figures may be configured to implement the state diagram shown in FIG. 9. In various embodiments, some of the state transitions shown may be performed concurrently, in a different order than shown, or may be omitted. Additional state transitions may also be performed as desired. As shown, this state diagram may operate as follows.

Initially, upon a datapath request and/or datapath response 902 (e.g., upon initiation of a datapath/peer-to-peer data transmission session negotiation), the time slot allocation may default (initialize) to state 2 (e.g., corresponding to Tier 2 906, 25% bandwidth allocation as illustrated by FIG. 10) for peer devices involved in the datapath request/datapath response, such as client station 106. As shown, if a low latency traffic peer-to-peer data transmission session is established, the peer devices may transition (e.g., transition 940) to state 5 (e.g., corresponding to Tier 5 912, 100% bandwidth allocation as illustrated by FIG. 10) upon establishment. Alternatively, if a non low latency traffic peer-to-peer data transmission session is established, the peer devices may transition (e.g., via transition 932) to state 3 (e.g., corresponding to Tier 3 908, 50% bandwidth allocation as illustrated by FIG. 10) upon establishment.

Once the devices are in state 3 (e.g., Tier 3 908), the devices may periodically sample data traffic metrics to determine whether to transition (e.g., via transition 924) down to state 2 (e.g., Tier 2 906), transition (e.g., via transition 934) up to state 4 (e.g., Tier 4 910), and/or remain in state 3 (e.g., Tier 3 908). In some embodiments, transitioning between states may be based, at least in part, on comparing one or more data traffic metrics to specific criteria, e.g., as further illustrated by FIGS. 11 and 12. For example, the devices may transition from state 3 to state 4 (e.g., via transition 934) if, as illustrated by FIG. 11, 128 or more data packets have been transmitted or received between discovery windows. In other words, the devices may upgrade bandwidth allocation if at least a minimum number of data packets have been transmitted or received during a time period (e.g., assuming 1 discovery window per time period). As another example, the devices may transition from state 3 to state 2 (e.g., via transition 924) if, as illustrated by FIG. 12, 64 or less data packets have been transmitted and 64 or less data packets have been received between discovery windows for four consecutive discovery windows. In other words, the devices may downgrade bandwidth allocation if no more than a maximum number of data packets have been transmitted and if no more than the maximum number of data packets have been received during a time period for a number of consecutive time periods (e.g., assuming 1 discovery window per time period).

Once the devices are in state 4 (e.g., Tier 4 910), the devices may periodically sample data traffic metrics to determine whether to transition (e.g., via transition 926) down to state 3 (e.g., Tier 3 908), transition (e.g., via transition 936) up to state 5 (e.g., Tier 5 912)), and/or remain in state 4 (e.g., Tier 4 910). For example, the devices may transition from state 4 to state 5 (e.g., via transition 936) if, as illustrated by FIG. 11, 256 or more data packets have been transmitted or received between discovery windows. As another example, the devices may transition from state 4 to state 3 if, as illustrated by FIG. 12, 128 or less data packets have been transmitted and 128 or less data packets have been received between discovery windows for three consecutive discovery windows.

Once the devices are in state 5 (e.g., Tier 5 912), the devices may periodically sample data traffic metrics to determine whether to transition (e.g., via transition 928) down to state 4 (e.g., Tier 4 910) or remain (e.g., via transition 938) at state 5 (e.g., Tier 5 912). For example, the devices may remain at state 5 (e.g., via transition 938) if, as illustrated by FIG. 11, 256 or more data packets have been transmitted or received between discovery windows. As another example, the devices may transition from state 5 to state 4 if, as illustrated by FIG. 12, 256 or less data packets have been transmitted and 128 or less data packets have been received between discovery windows for three consecutive discovery windows.

Returning to state 2 (e.g., Tier 2 906), once the devices are in state 2 (e.g., upon transitioning from state 3), the devices may periodically sample data traffic metrics to determine whether to transition (e.g., via transition 922) down to state 1 (e.g., Tier 1 904)), transition (e.g., via transition 932) up to state 3 (e.g., Tier 3 908), and/or remain in state 2. For example, the devices may transition from state 2 to state 3 (e.g., via transition 932) if, as illustrated by FIG. 11, 64 or more data packets have been transmitted or received between discovery windows. As another example, the devices may transition from state 2 to state 1 if, as illustrated by FIG. 12, no data packets have been transmitted and received between discovery windows for four consecutive discovery windows.

Once the devices are in state 1 (e.g., Tier 1 904), the devices may periodically sample data traffic metrics to determine whether to remain in state 1 (e.g., via transition 920) or to transition (e.g., via transition 930) up to state 3 (e.g., Tier 3 908). For example, the devices may transition up to state 3 (e.g., via transition 930) if, as illustrated by FIG. 11, 1 or more data packets have been transmitted or received between discovery windows. As another example, the devices may remain in state 1 if, as illustrated by FIG. 12, no data packets have been transmitted and received between discovery windows for two consecutive discovery windows.

Preferred Channel Learning

As noted above, in some implementations of NAN, a NAN datapath may require time slots and channels to be allocated for data transfer between peer wireless devices. In other words, time slots and channels may be allocated for data transfer between peer wireless devices. In some implementations, the allocation may result in a fixed (or static) schedule. However, such a schedule may be inefficient. For example, such a schedule may cause unnecessary power consumption due to under utilization of time slots. In other words, if too many time slots are not utilized, the wireless devices may consume power to be available (e.g., for transmission or reception of data) during the time slots that are not used and/or not completely utilized for data transmission. In addition, such a schedule may not be adaptable to bursty (e.g., intermittent) data traffic. Further, in some implementations, only overlapping time slots may be utilized in an asymmetric schedule between peers. In other words, time slots with mis-matched channels may be unusable. Thus, in some embodiments as described herein, peer wireless devices may adapt synchronously to common channels for optimized performance.

For example, as noted above, low latency data traffic may typically be allocated 100 percent bandwidth for a peer-to-peer data session. In other words, each peer in the peer-to-peer data session may be available for all transmissions on the same channel, e.g., as illustrated in FIG. 13A. However, if one of the peers, e.g., node 1306a (e.g., a client station 106), is also associated with a Wi-Fi access point, node 1306a may allocate an infrastructure channel (e.g., channel 36) associated with the Wi-Fi access point for some time block in the time period, e.g., as illustrated by FIG. 13A. In other words, node 1306a may prefer (or have preference for) one channel (e.g., channel 36) for at least a portion of the time period. However, if the other peer (e.g., node 1306b) is unaware of the preference, node 1306b (e.g., a client station 106) may remain on another channel (e.g., channel 149) during those time blocks. Thus, the bandwidth allocation for the peer-to-peer data session is effectively reduced below 100 percent, e.g., as illustrated by FIG. 13B. Hence, in some embodiments, a wireless station (such as client station 106) may advertise a preference for a channel (e.g., such as an infrastructure channel associated with a Wi-Fi access point) to neighboring wireless stations. For example, as FIG. 13C illustrates, node 1306b may learn from node 1306a's advertisement of preference for channel 36 that node 1306a will switch during the time period to channel 36 from the social channel (e.g., channel 149). As shown, when there is one preferred channel in the peer-to-peer data session, the bandwidth may be split equally between the social channel (e.g., the channel the peer devices discovered one another on) and the preferred channel, with the social channel being assigned the first half of the time blocks within the time period and the preferred channel being assigned the second half of the time blocks with the time period.

Figure 14B:
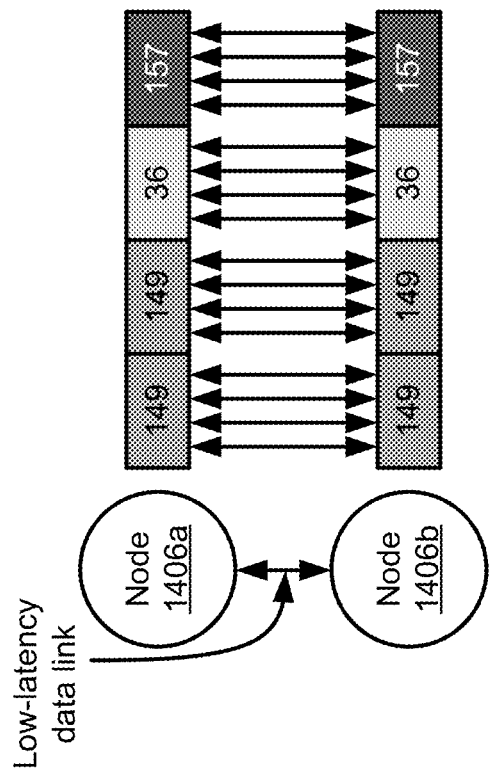
FIGS. 14A-B illustrate another example of peer devices adapting to channel preferences, according to some embodiments.
Figure 14A:
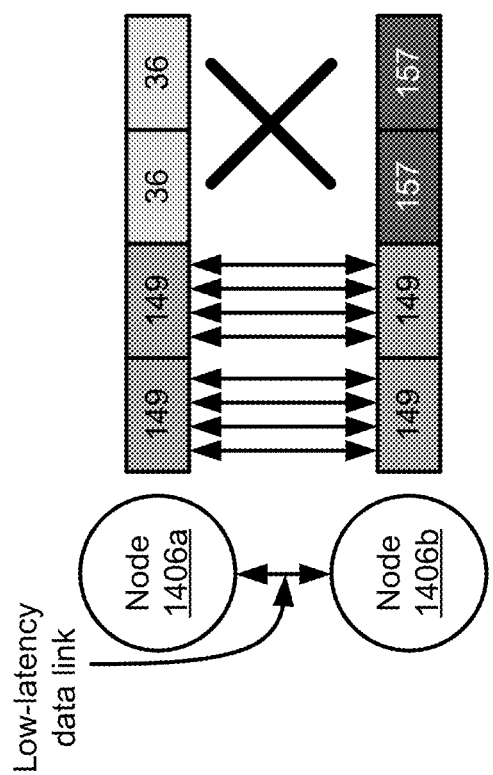

FIGS. 14A-B illustrate another example of peer devices adapting to channel preferences, according to some embodiments. As shown, peer devices (e.g., client stations 106) may discover one another on a social channel, e.g., channel 149, and may establish a low latency peer-to-peer data session. In addition, as shown in FIG. 14A, node 1406a may be associated with a first Wi-Fi access point operating on infrastructure channel 36, thus node 1406a may prefer channel 36, and as discussed above, may allocate half of its time blocks in a time period to channel 36 and the other half to channel 149. Similarly, node 1406b may be associated with a second Wi-Fi access point operating on infrastructure channel 157, thus node 1406b may prefer channel 157, and as discussed above, may allocate half of its time blocks in a time period to channel 157 and the other half to channel 149. Hence, as shown in FIG. 14A, if the peer devices are not aware of one another's channel preferences, bandwidth for the peer-to-peer data session may be reduced. Hence, in some embodiments, node 1406b may learn from node 1406a's advertisement of preference for channel 36 that node 1406a will switch during the time period to channel 36 from the social channel (e.g., channel 149) and node 1406a may learn from node 1406b's advertisement of preference for channel 157 that node 1406b will switch during the time period to channel 157 from the social channel. Thus, once the peers learn of each other's preferences, the peers will allocate a quarter of the time blocks within the time period to each preferred channel while half of the time blocks will remain allocated on the social channel. In some embodiments, a lower channel may be assigned time blocks (or a time block) prior to the higher channel being assigned time blocks (or a time block).

Figure 15B:
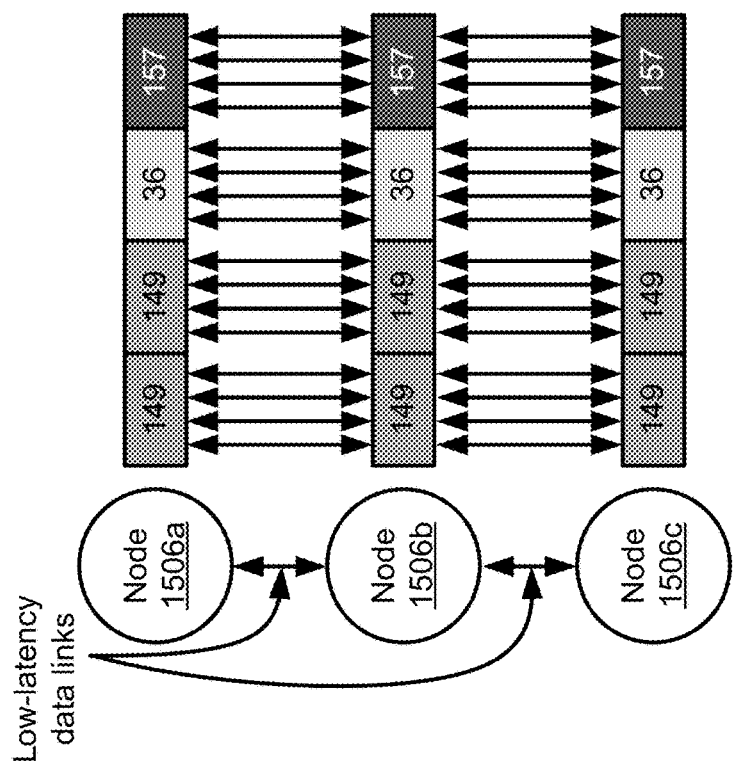
FIGS. 15A-B illustrate another example of peer devices adapting to channel preferences, according to some embodiments.
Figure 15A:
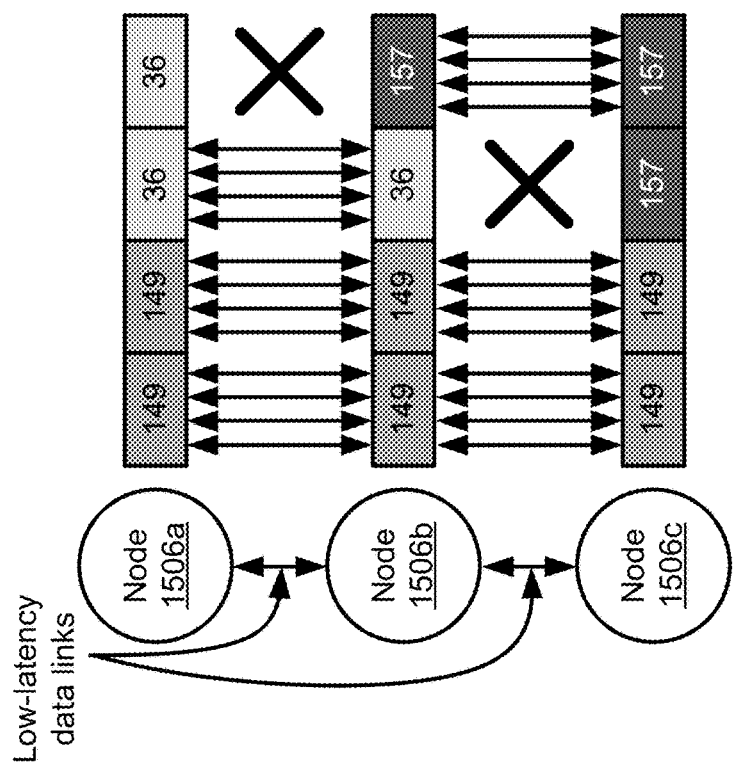

FIGS. 15A-B illustrate another example of peer devices adapting to channel preferences, according to some embodiments. As shown, peer devices (e.g., client stations 106) may discover one another on a social channel, e.g., channel 149, and may establish a low latency peer-to-peer data session. In addition, as shown in FIG. 15A, node 1506a may be associated with a first Wi-Fi access point operating on infrastructure channel 36, thus node 1506a may prefer channel 36, and as discussed above, may allocate half of its time blocks in a time period to channel 36 and the other half to channel 149. Peer B may not have a channel preference, however, node 1506b may discover node 1506c on the social channel and may establish a low latency peer-to-peer data session with node 1506c. Peer C may be associated with a second Wi-Fi access point operating on infrastructure channel 157, thus node 1506c may prefer channel 157, and as discussed above, may allocate half of its time blocks in a time period to channel 157 and the other half to channel 149. Thus, node 1506b may be aware of both node 1506a's and node 1506c's channel preferences and may adjust its channel allocations accordingly. However, peers A and C may not be aware of one another's channel preferences, hence, as shown in FIG. 15A, peers A and C may not allocate channels based on one another's preferences and bandwidth for the peer-to-peer data sessions may be reduced. Hence, in some embodiments, node 1506b may learn from node 1506a's advertisement of preference for channel 36 and node 1506c's preference for channel 157 and may propagate the preferences to neighboring peers. For example, node 1506b may inform node 1506a of node 1506c's channel preference and node 1506b may inform node 1506c of node 1506a's channel preference. In response, as illustrated by FIG. 15B, node 1506a may update its channel allocation to accommodate node 1506c's preference and node 1506c may update its channel allocation to accommodate node 1506a's preference. Hence, both peer-to-peer data sessions may achieve 100 percent bandwidth allocation.

Figure 16B:
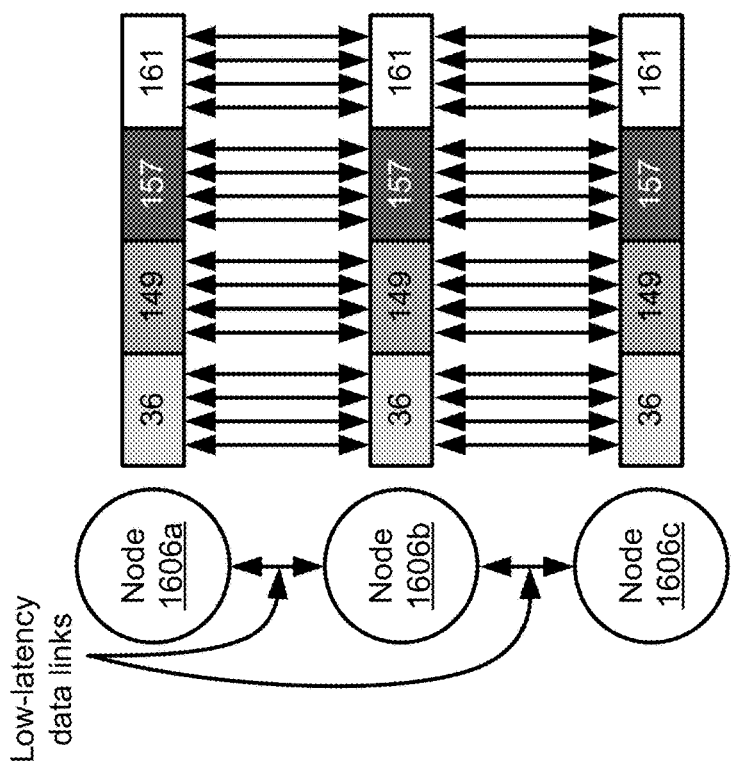
FIGS. 16A-B illustrate another example of peer devices adapting to channel preferences, according to some embodiments.
Figure 16A:
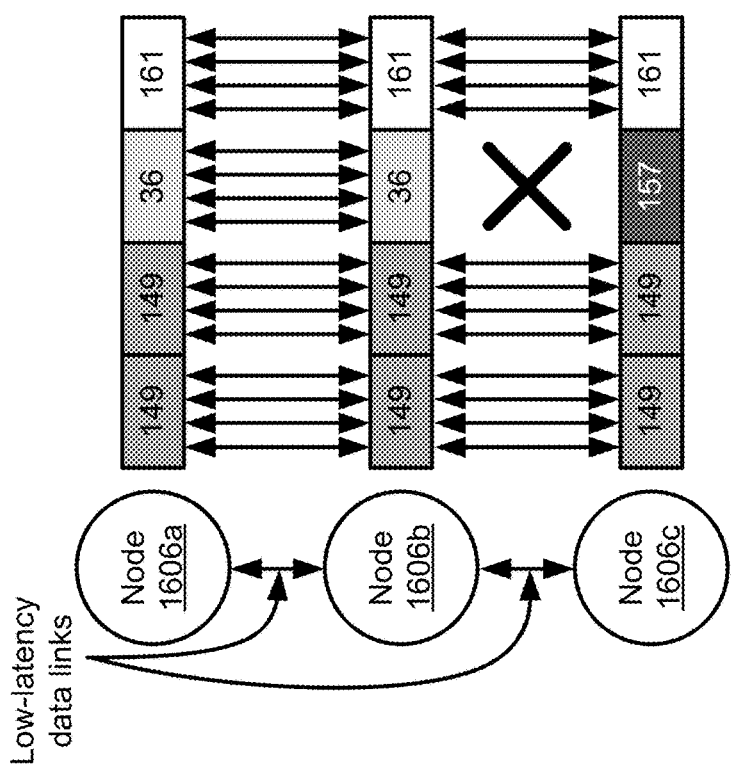

FIGS. 16A-B illustrate another example of peer devices adapting to channel preferences, according to some embodiments. As shown, peer devices may discover one another on a social channel, e.g., channel 149, and may establish a low latency peer-to-peer data session. In addition, as shown in FIG. 16A, node 1606*a* may be associated with a first Wi-Fi access point operating on infrastructure channel 36, thus node 1606*a* may prefer channel 36. Similarly, node 1606*b* may be associated with a second Wi-Fi access point operating on infrastructure channel 161, thus node 1606*b* may prefer channel 161. Further, node 1606*c* may be associated with a third Wi-Fi access point operating on infrastructure channel 157, thus node 1606*c* may prefer channel 157. As discussed above, node 1606*b* may be aware of both node 1606*a*'s and node 1606*c*'s channel preferences and may adjust its channel allocations accordingly. However, nodes 1606*a* and 1606*c* may not be aware of one another's channel preferences, hence, as shown in FIG. 16A, nodes 1606*a* and 1606*c* may not allocate channels based on one another's preferences and bandwidth for the peer-to-peer data sessions may be reduced. Hence, in some embodiments, node 1606*b* may learn from node 1606*a*'s advertisement of preference for channel 36 and node 1606*c*'s preference for channel 157 and may propagate the preferences to neighboring peers. For example, node 1606*b* may inform node 1606*a* of node 1606*c*'s channel preference and node 1606*b* may inform node 1606*c* of node 1606*a*'s channel preference. In response, as illustrated by FIG. 16B, node 1606*a* may update its channel allocation to accommodate node 1606*c*'s preference and node 1606*c* may update its channel allocation to accommodate node 1606*a*'s preference. Hence, both peer-to-peer data sessions may achieve 100 percent bandwidth allocation.

In some embodiments, to coordinate propagation and learning of channel preferences of neighboring and remote peers, a preferred channel learning (PCL) protocol (or algorithm) may be implemented by each device. In other words, a wireless station, such as client station 106, may implement a mechanism to learn preferred channels of peer wireless stations. In some embodiments, the mechanism (e.g., the PCL protocol) may run (or be performed) periodically and synchronously on all devices. In some embodiments, the PCL protocol may allow a device (e.g., client station 106) to learn (and/or to determine and/or to be informed of) preferred non-social channels of peer devices within a data cluster. In some embodiments, the PCL protocol may be run (and/or triggered) when a peer-to-peer data session requires 100 percent bandwidth. In some embodiments, once preferred channels are known (learned), the preferred channels may be assigned to respective time blocks. In some embodiments, a single radio device may support a maximum of two preferred channels for a time period. In some embodiments, a dual radio device may support a maximum of three preferred channels per time period. Note that the maximum number of supported preferred channels may increase for time periods greater than 512 TUs, where a TU is 1024 microseconds (1.024 milliseconds).

In some embodiments, a wireless device (e.g., such as client station 106) may maintain a table of preferred channels. In some embodiments, the wireless device may rank preferred channels based on a usage preference. For example, as illustrated by FIGS. 17A-D, a device (e.g., node 1706*a*) may initially not have any preferred channels, thus, as shown in FIG. 17A, the device may not populate a usage preference table. In addition, as shown in FIG. 17B, an initial time period channel allocation for the device may include a social channel scheduled for each time block of the time period. However, as illustrated by FIGS. 17C-D, upon association with an access point with infrastructure channel 36, the wireless device (e.g., node 1706*a*) may update the usage preference table to indicate channel 36 as a preferred channel and the time period channel allocation may include the preferred channel assigned to half the time blocks of the time period. In some embodiments, the infrastructure channel of the access point associated with the wireless device may be assigned a highest usage preference. In addition, in some embodiments, the wireless device may include the preferred channel and/or the usage preference table in beacons and discovery frames transmitted to neighboring peer devices.

Figure 18:
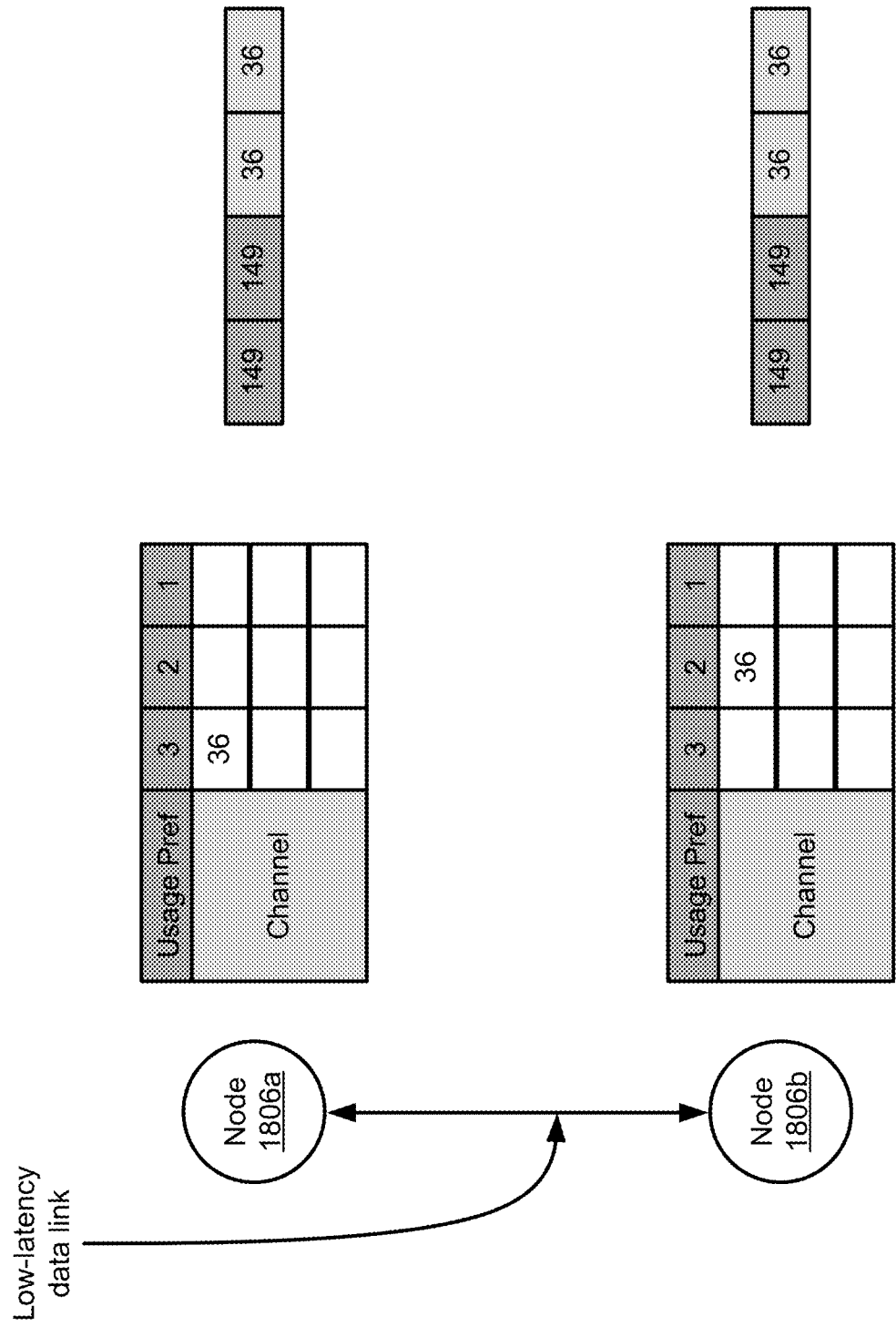
FIG. 18 illustrates an example of inheriting a preferred channel, according to some embodiments.

In some embodiments, upon establishment of a low latency data link with a peer device associated with an access point (and/or with an established preferred channel), a wireless device (such as client station 106) may inherit (e.g., learn, become informed, and/or determine) a preferred channel of the peer device. For example, as illustrated by FIG. 18, node 1806*a* (e.g., a client station 106) is associated with an access point with infrastructure channel 36. Thus, as described above, node 1806*a* may assign channel 36 a highest usage preference (e.g., "3") and inform node 1806*b* (e.g., a client station 106). Thus, node 1806*a* may include the preferred channel and/or usage preference in a discovery frame and/or beacon. For example, the preferred channel may be included in an availability attribute (e.g., a NAN availability attribute) included in a discovery frame (e.g., service discovery frame). Node 1806*b*, upon learning of node 1806*a*'s preferred channel, may add node 1806*a*'s preferred channel to its usage preference table and assign the channel with a next highest usage preference (e.g., "2"). In addition, as shown, the devices may allocate channels for time blocks in a time period based on the usage preference table.

Figure 19:
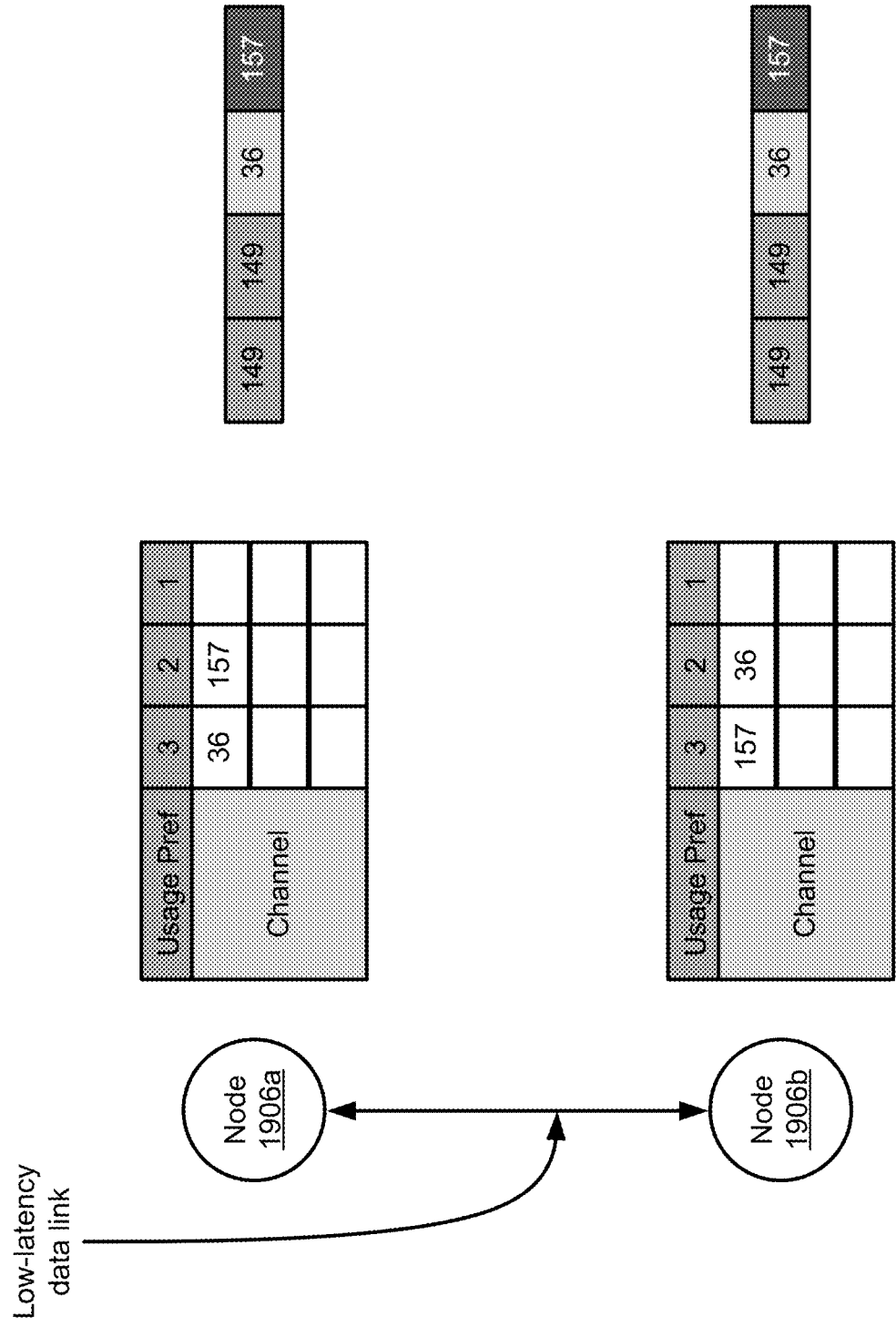
FIG. 19 illustrates another example of inheriting a preferred channel, according to some embodiments.

FIG. 19 illustrates another example of inheriting a preferred channel, according to some embodiments. As shown, node 1806*a* (e.g., a client station 106) is associated with an access point with infrastructure channel 36. Thus, as described above, node 1806*a* may assign channel 36 a highest usage preference (e.g., "3") and inform node 1806*b* (e.g., a client station 106). Thus, node 1806*a* may include the preferred channel and/or usage preference in a discovery frame and/or beacon. For example, the preferred channel may be included in an availability attribute (e.g., a NAN availability attribute) included in a discovery frame (e.g., service discovery frame). Similarly, peer node 1806*b* is associated with an access point with infrastructure channel 157. Thus, as described above, node 1806*b* may assign channel 157 a highest usage preference (e.g., "3") and inform node 1806*a*. Thus, node 1806*b* may include the preferred channel and/or usage preference in a discovery frame and/or beacon. For example, the preferred channel may be included in an availability attribute (e.g., a NAN availability attribute) included in a discovery frame (e.g., service discovery frame). Node 1806*b*, upon learning of node 1806*a*'s preferred channel, may add node 1806*a*'s preferred channel to its usage preference table and assign the channel with a next highest usage preference (e.g., "2"). Similarly, node 1806*a*, upon learning of node 1806*b*'s preferred channel, may add node 1806*b*'s preferred channel to its usage preference table and assign the channel with a next highest usage preference (e.g., "2"). In addition, as shown, the devices may allocate channels for time blocks in a time period based on the usage preference table, with the lower channel number being assigned a time block prior to the higher channel number. In other words, a lowest (non-social) channel number may be assigned to a first occurring time block prior to a higher (non-social) channel number being assigned to a time block. Note that in some embodiments, a social channel may be assigned to a time block (or time blocks) prior to the lowest (non-social) cannel number being assigned to a time block.

Figure 20A:
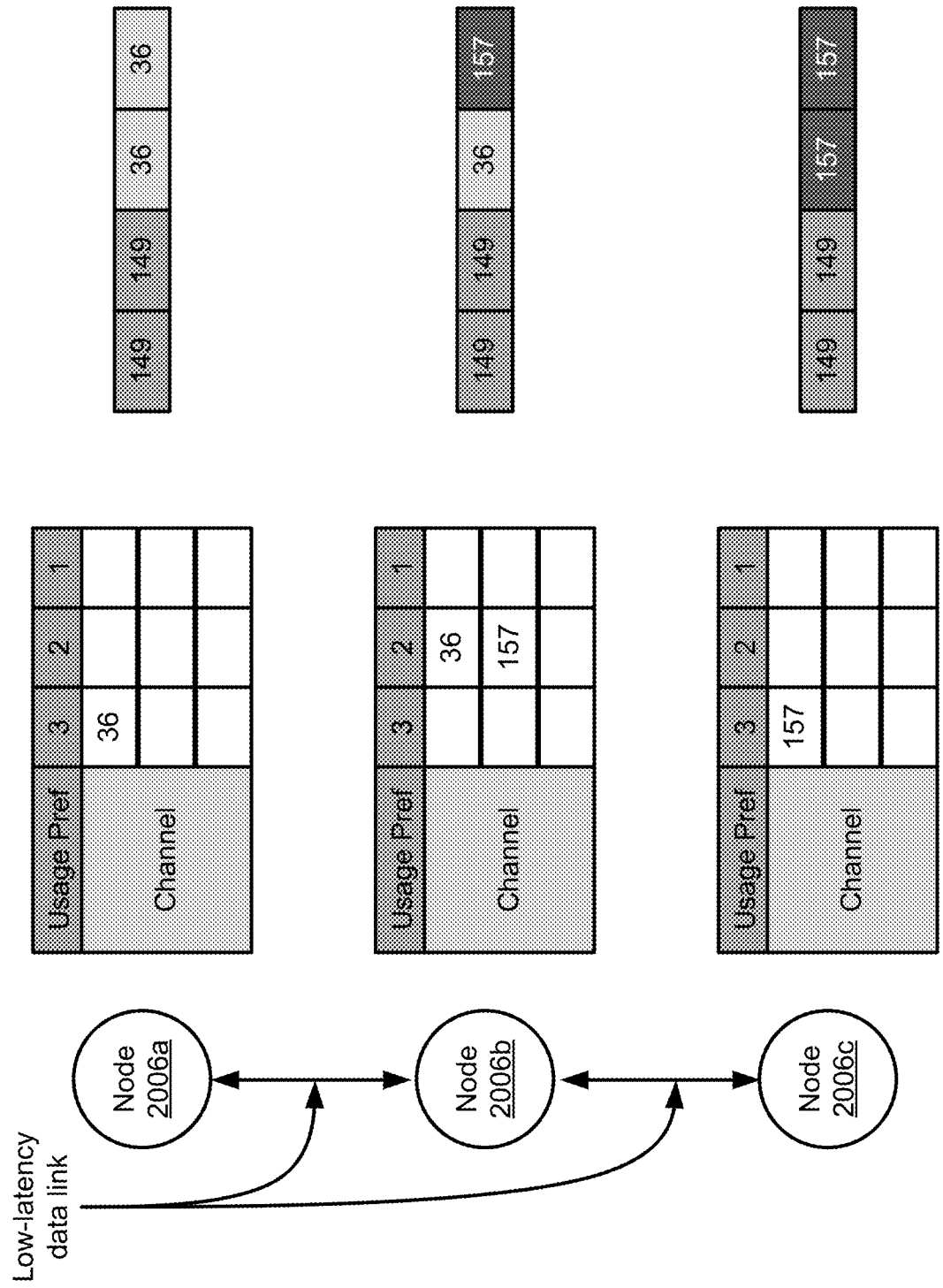
FIGS. 20A-B illustrate an example of remote devices inheriting channel preferences via an intermediate device, according to some embodiments.
Figure 20B:
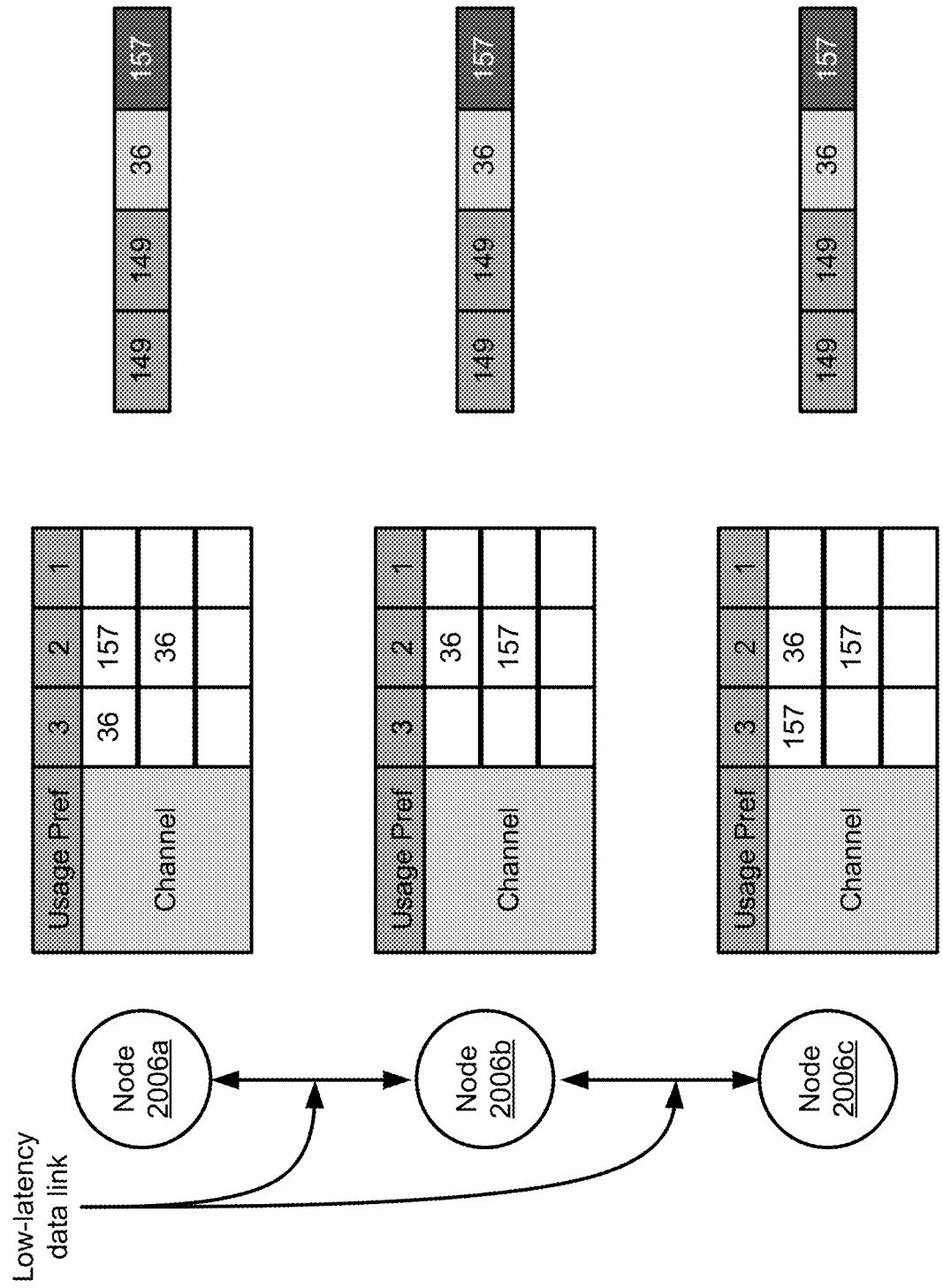

In some embodiments, devices (e.g., client stations 106) may also inherit channels with a next highest preference. For example, as shown in FIG. 20A, when a device (e.g., node 2006b) not associated with an access point establishes low latency data links with multiple devices (e.g., nodes 2006a and 2006c) associated with access points, nodes 2006a and 2006c may not initially be aware of one another's channel preferences, thus 100 percent bandwidth may not be achieved. However, as illustrated by FIG. 20B, node 2006a may inherit node 2006c's preferred channel via node 2006b. Similarly, node 2006c may inherit node 2006a's preferred channel via node 2006b. Thus, 100 percent bandwidth may be achieved.

Figure 21:
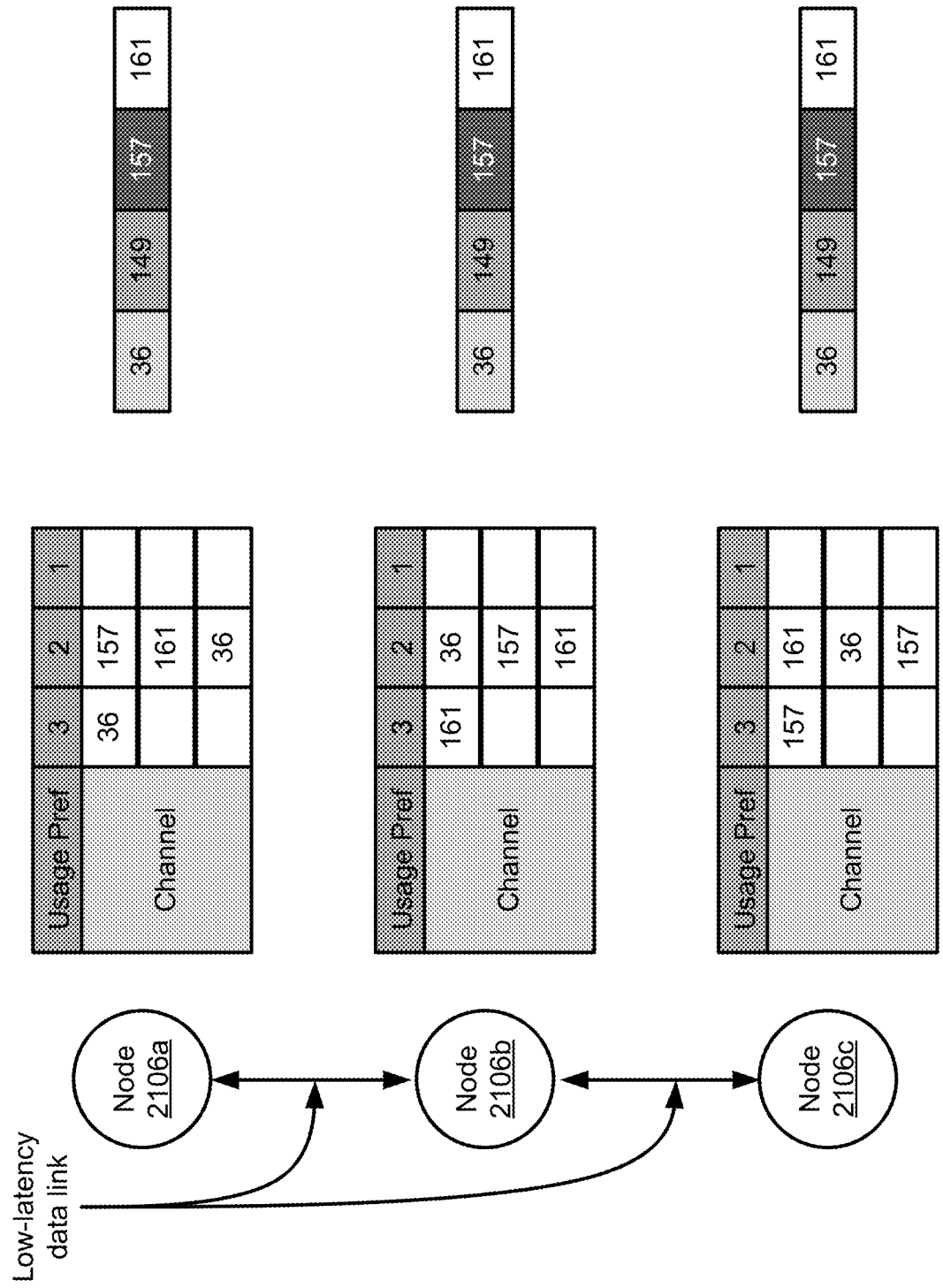
FIG. 21 illustrates another example of remote devices inheriting channel preferences via an intermediate device, according to some embodiments.

FIG. 21 illustrates another example of remote devices inheriting channel preferences via an intermediate device, according to some embodiments. As shown, nodes 2106a, 2106b, and 2106c (e.g., client stations 106) may each be associated with an access point and may each have a preferred channel. Thus, as described above, each device may update a usage preference table with the infrastructure channel associated with the access point. Further, each device may inform neighboring devices of its preferred channel as well as the preferred channels of neighboring devices (e.g., via the usage preference table and channel inheritance described above). Thus, as described above, node 2106a may assign channel 36 a highest usage preference (e.g., "3") and inform node 2106b. Thus, node 2106a may include the preferred channel and/or usage preference in a discovery frame and/or beacon. For example, the preferred channel may be included in an availability attribute (e.g., a NAN availability attribute) included in a discovery frame (e.g., service discovery frame). Similarly, peer node 2106c is associated with an access point with infrastructure channel 157. Thus, as described above, node 2106c may assign channel 157 a highest usage preference (e.g., "3") and inform node 2106b. Thus, node 2106c may include the preferred channel and/or usage preference in a discovery frame and/or beacon. For example, the preferred channel may be included in an availability attribute (e.g., a NAN availability attribute) included in a discovery frame (e.g., service discovery frame). Device B, upon learning of node 2106c's preferred channel, may add node 2106c's preferred channel to its usage preference table and assign the channel with a next highest usage preference (e.g., "2"). Further, node 2106b may be associated with an access point and may assign the infrastructure channel of the access point (e.g., channel 161) a highest usage preference. Thus, node 2106b may have channel 161 assigned a highest usage preference and additionally have channels 157 and 36 assigned a next highest usage preference. Device B may then propagate node 2106c's preferences to node 2106a and node 2106a's preferences to node 2106c, as shown. Note that in some embodiments, duplicate channels with a lower usage preference may be eliminated based on best channel selection.

Figure 22:
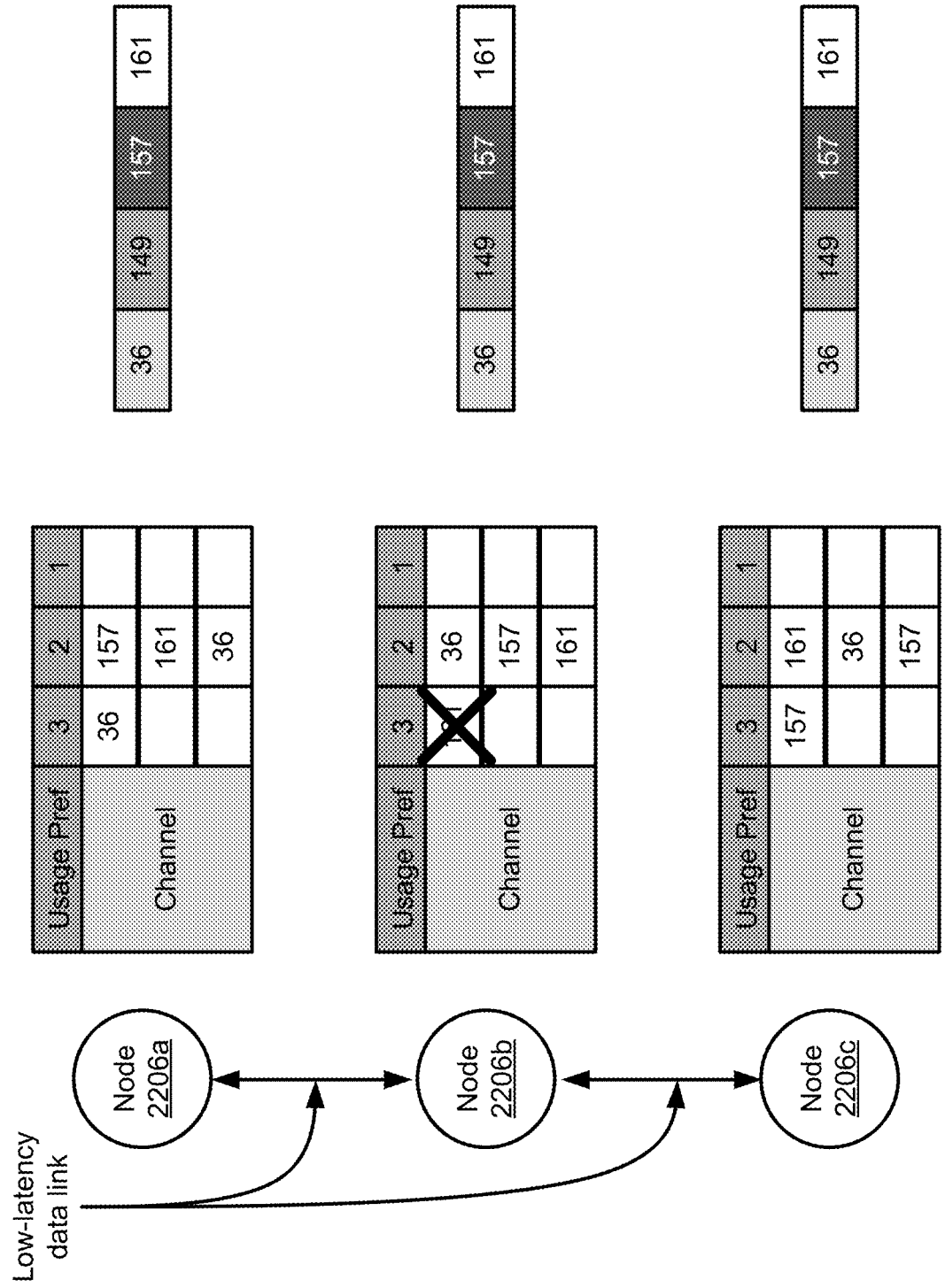
FIG. 22 illustrates an example of an expired preferred channel remaining as a preferred channel.

FIG. 22 illustrates an example of an expired preferred channel remaining as a preferred channel. For example, after the preferred channels between nodes 2206a, 2206b, and 2206c (e.g., client stations 106) have been shared (e.g., as described above in reference to FIG. 21), one of the devices (e.g., node 2206b) may dis-associate with an access point, thus removing a highest preference for the infrastructure channel of that access point. However, as shown in FIG. 22, peer nodes 2206a and 2206c may maintain a next highest preference for the infrastructure channel (e.g., channel 161).

Figure 23:
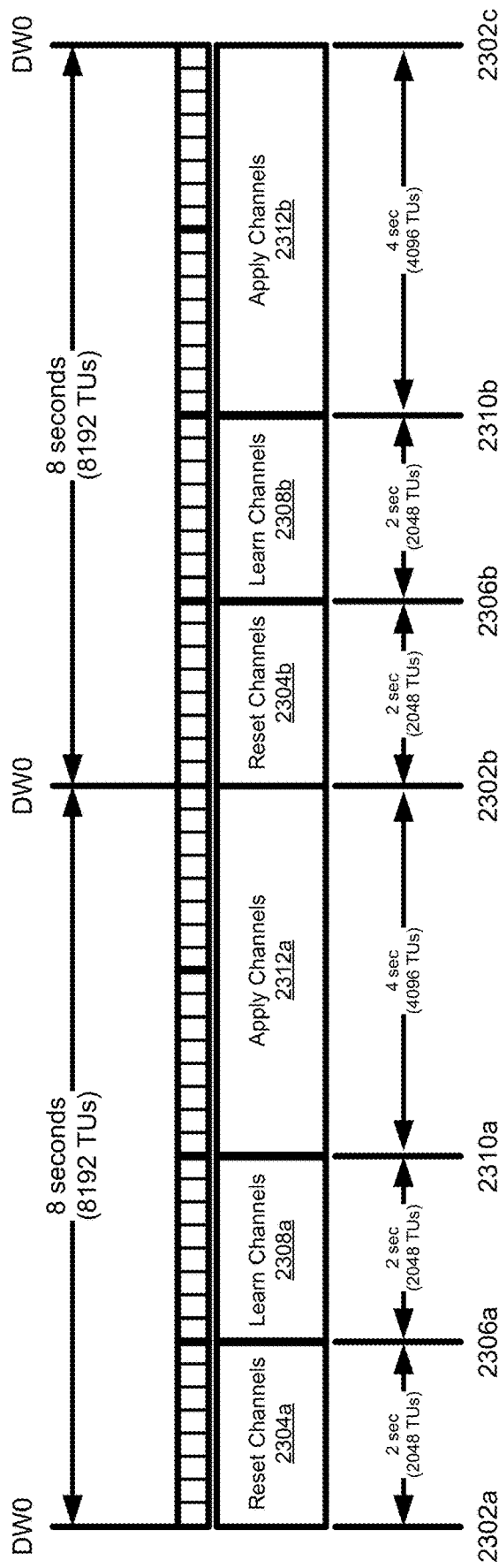
FIG. 23 illustrates an example timeline of a periodic reset-learn-apply algorithm for learning and updating preferred channels, according to some embodiments.

Thus, in some embodiments, the PCL protocol may include a reset-learn-apply cycle that may be run periodically, e.g., as illustrated by FIG. 23. As shown, at a beginning 2302a of a time period (e.g., at DW0), a device (such as client station 106) may reset (e.g., Reset Channels 2304a) its usage preference table by clearing all inherited preferred channels with a next highest usage preference (e.g., "2") while maintaining preferred channels with a highest usage preference (e.g., "3"). After a first time period (e.g., at 2306a and after, e.g., 2 seconds), a device may learn (or inherit) preferred channels (e.g., Learn Channels 2308a) from peer devices. For example, in some embodiments, all inherited preferred channels (e.g., highest usage preference (e.g., "3") and next highest usage preference (e.g., "2") channels) may be inherited as next highest usage preference channels (e.g., "2"). After a second time period (e.g., at 2310a and after, e.g., 2 seconds), the device may apply (e.g., Apply Channels 2312a) the preferred channels to time blocks of a time period. In other words, the device may re-evaluate the channel sequence for time blocks within a time period based on the preferred channel list. The update channel sequence for the time blocks may be maintained for a third time period (e.g., 4 seconds). After the third time period, e.g., at 2302b, the cycle may reset and the device may again reset its usage preference table (e.g., Rest Channels 2304b) and repeat the process (e.g., at 2306b, Learn Channels 2308b, at 2310b, Apply Channels 2312b, and repeat again starting at 2302c).

Figure 24A:
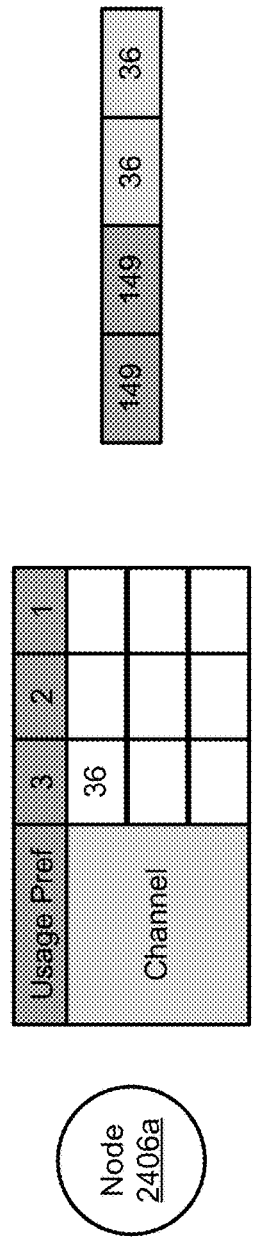
FIGS. 24A-24C, 25A-25C, and 26A-26C illustrate examples of the reset-learn-apply algorithm for various scenarios, according to some embodiments.
Figure 24A:
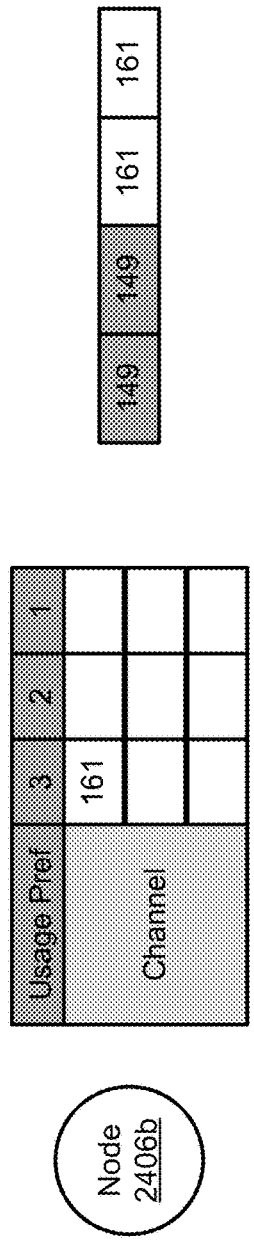
Figure 24A:
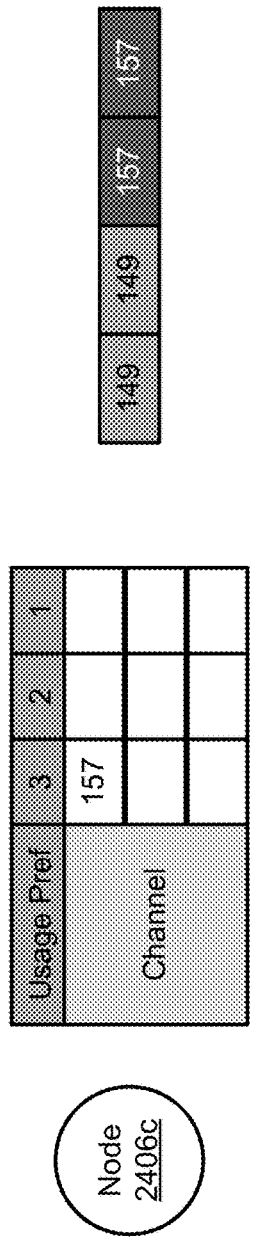
Figure 24B:
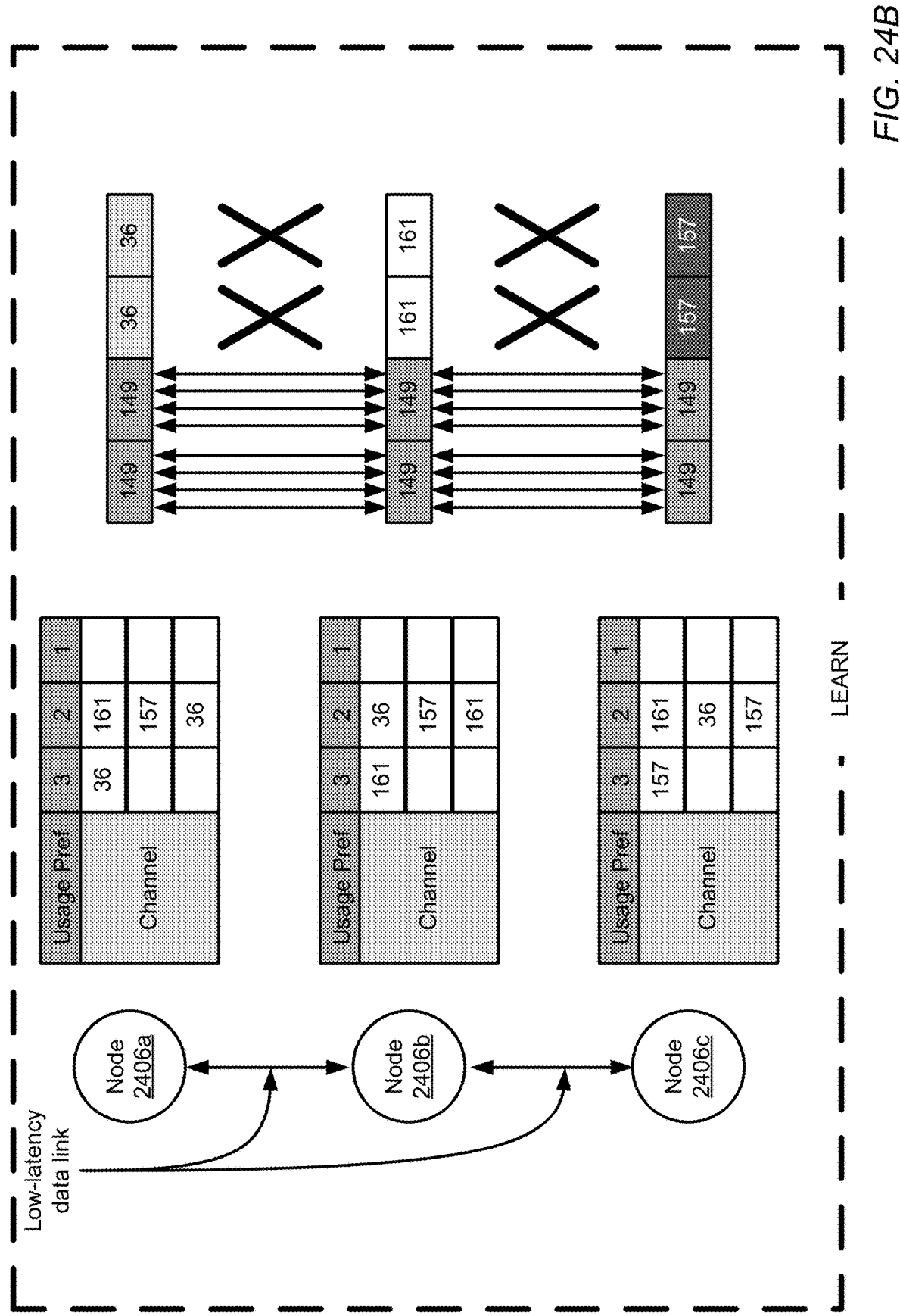
Figure 24C:
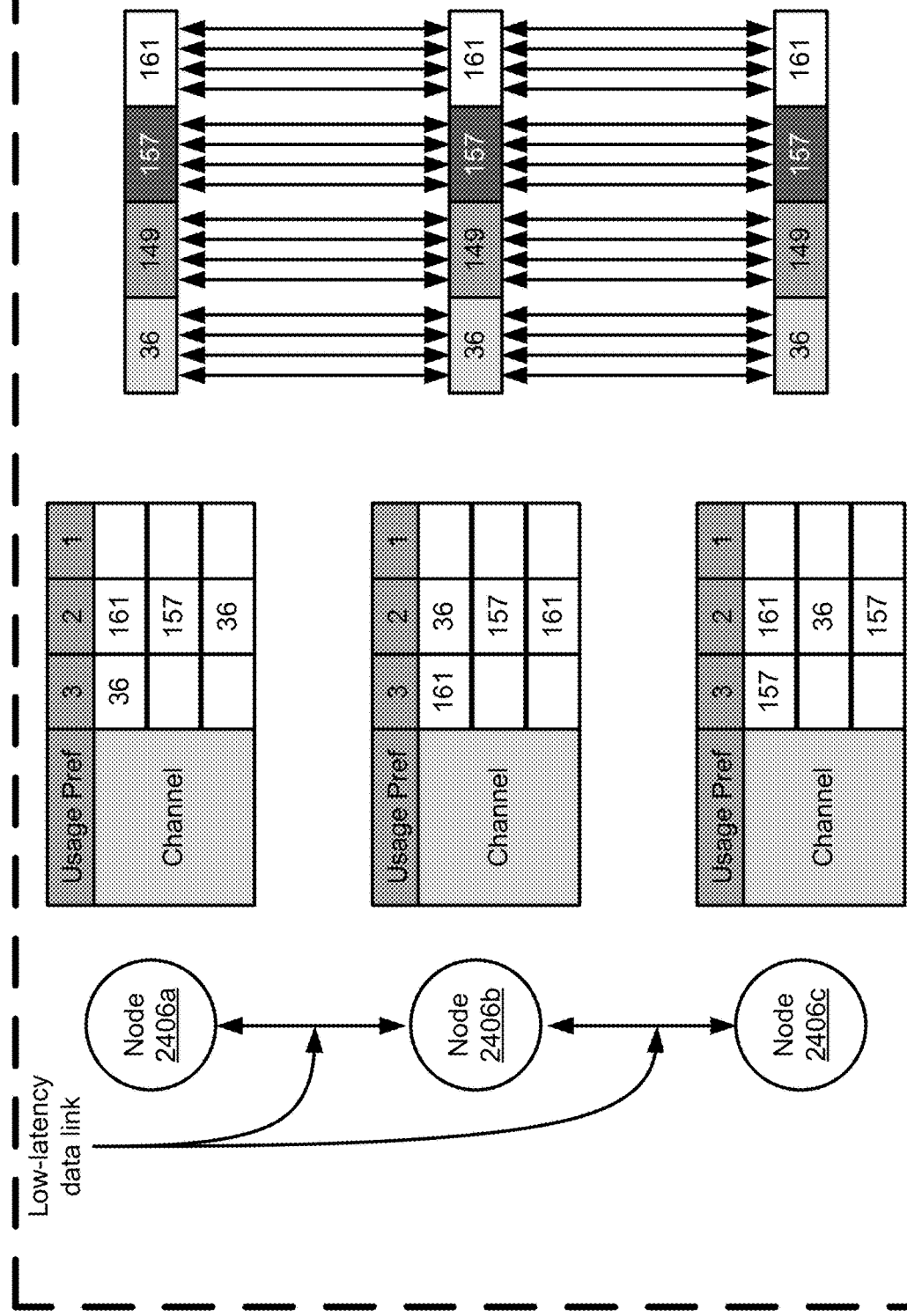

FIGS. 24A-C, 25A-C, and 26A-C illustrate examples of the reset-learn-apply algorithm for various scenarios, according to some embodiments. For example, FIGS. 24A-C illustrates propagation of preferred channels between nodes 2406a, 2406b, and 2406c (e.g., client stations 106) when each node is associated with a different access point. As shown by FIG. 24A, at the reset stage, each node's usage preference table may only include the infrastructure channel of the access point associate with a particular node. As shown by FIG. 24B, at the learn stage, each node may inherit the highest usage preference channel from one another, e.g., when nodes 2406a and 2406b have established a low latency data link and/or when nodes 2406b and 2406c have established a low latency data link. In addition, node's 2406a and 2406c may inherit the next highest usage channels of node 2406b. As shown by FIG. 24C, at the apply stage, the nodes may apply the usage preferences learned at the learn stage to the channel sequence for the time slots.

Figure 25A:
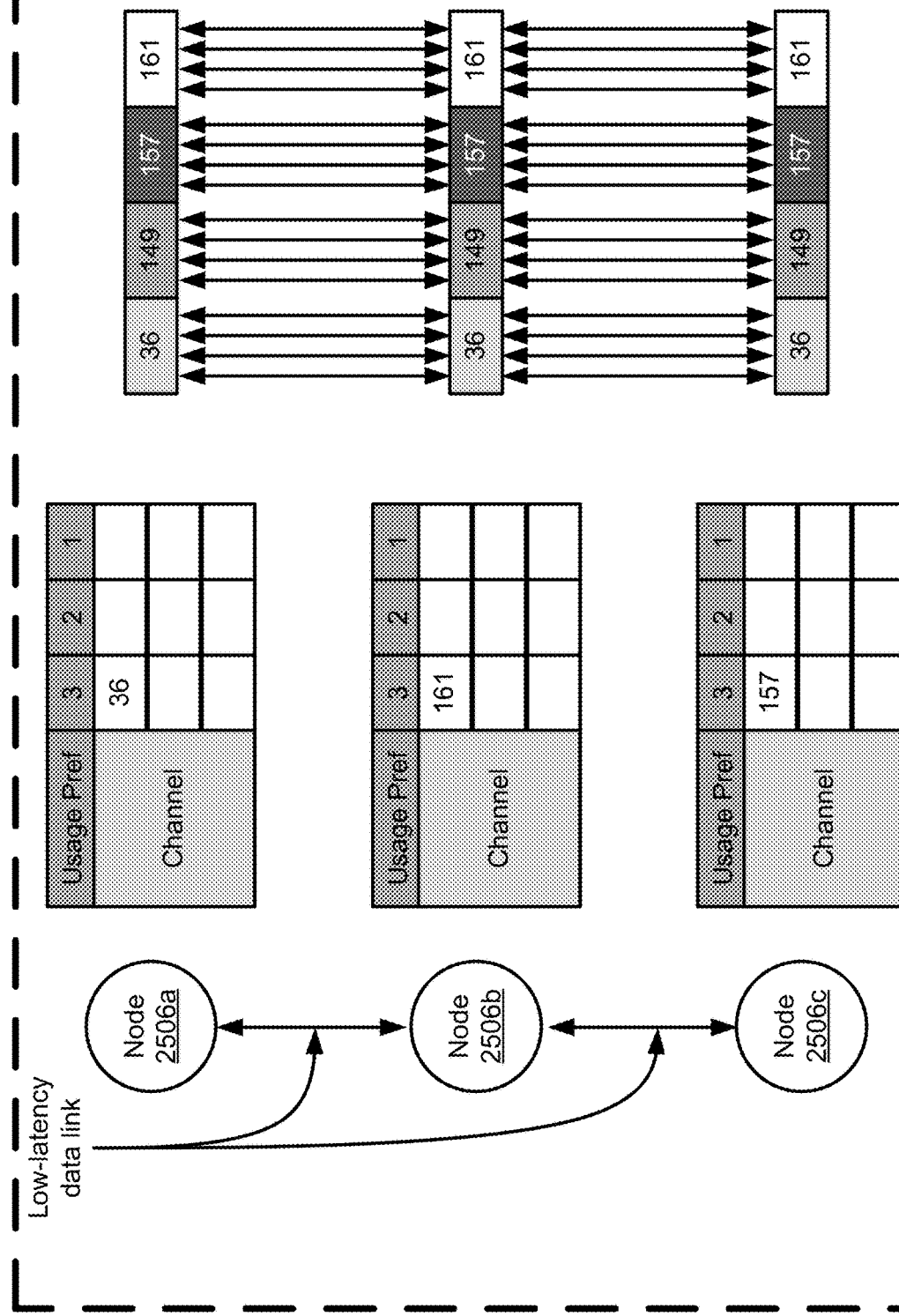
Figure 25B:
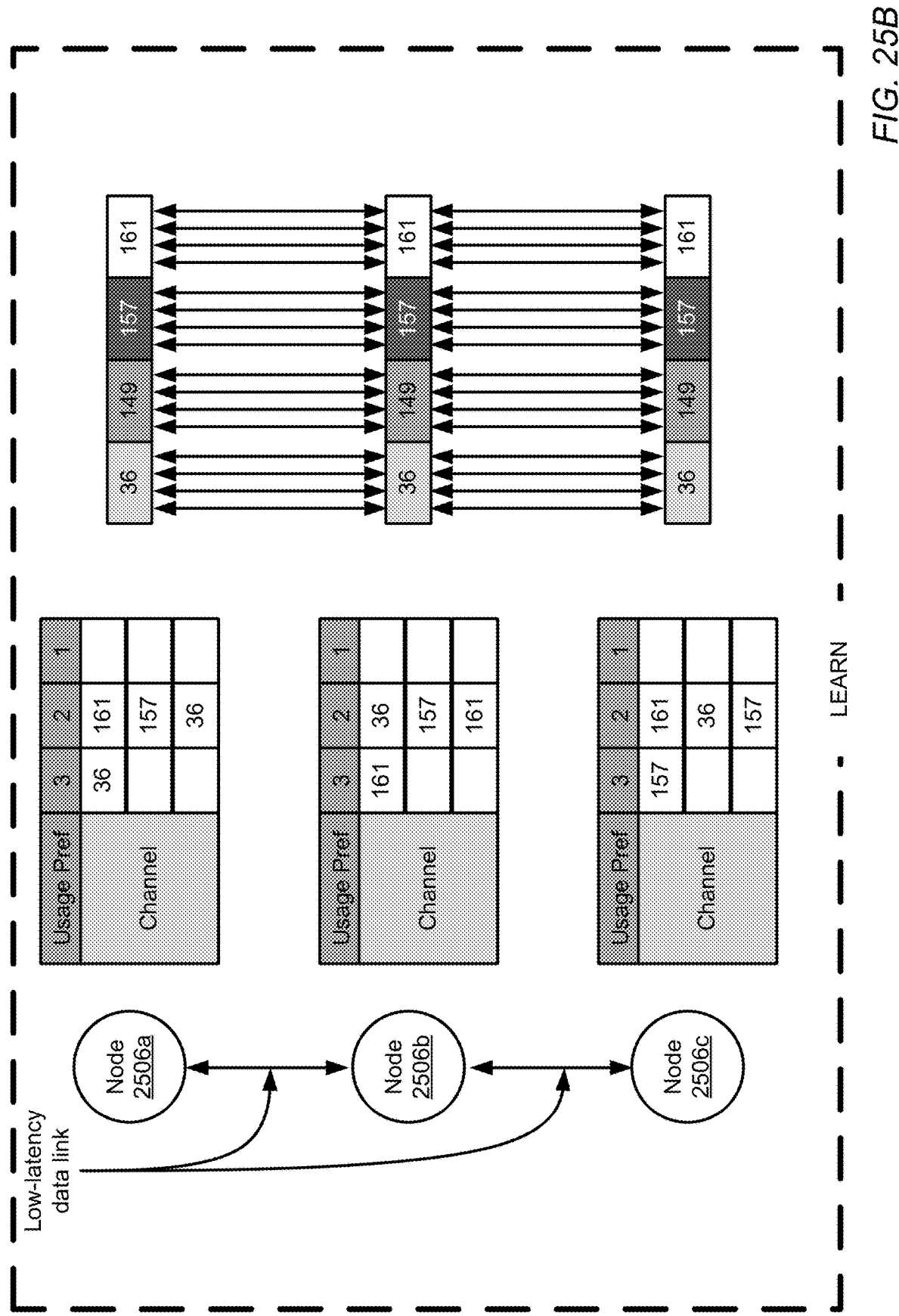
Figure 25C:
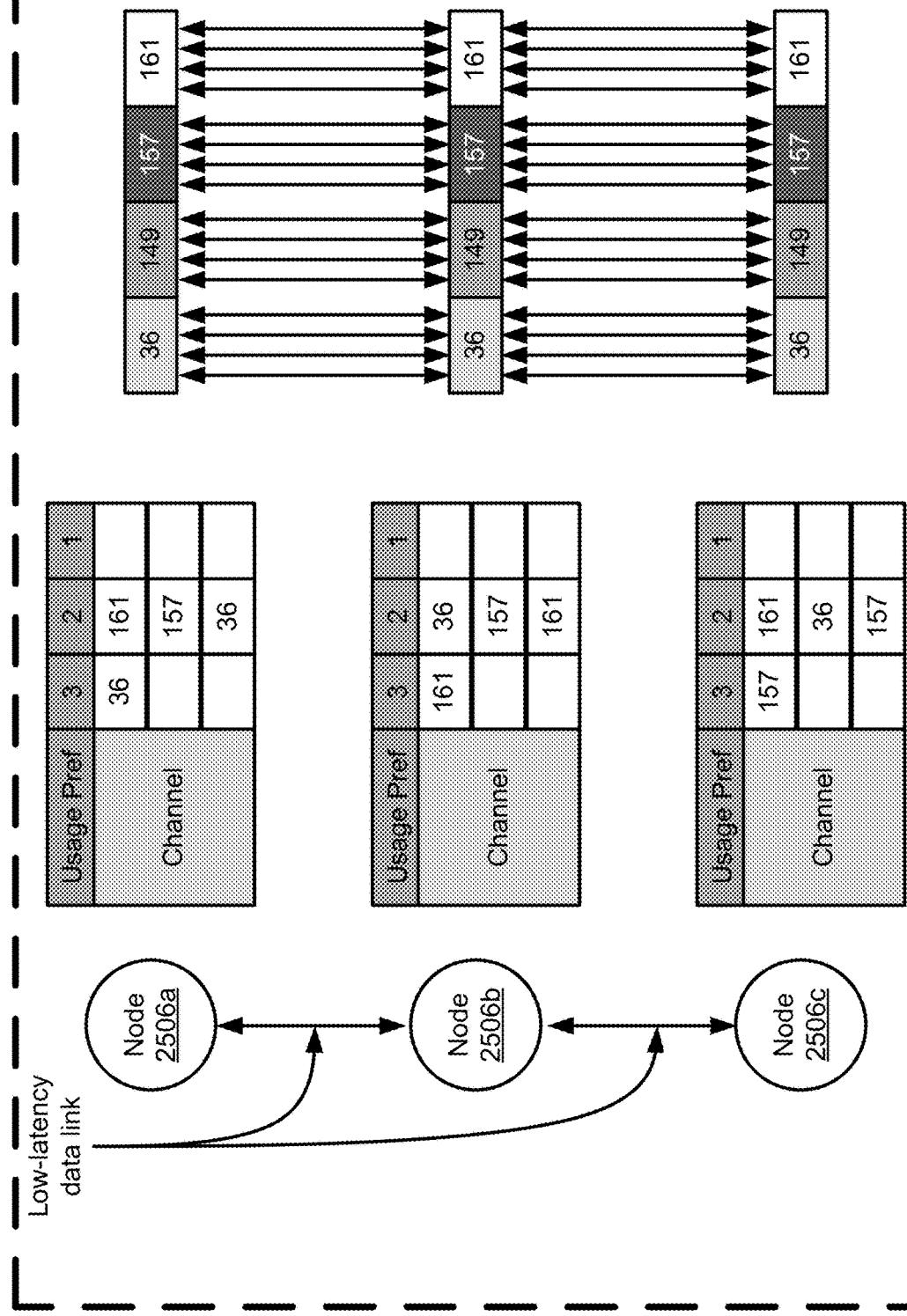

FIGS. 25A-C illustrates maintenance of the preferred channels once a channel sequence has been established, according to some embodiments. As shown, once the devices (e.g., client stations 106) have learned and applied peer device's preferred channels to a channel sequence for time blocks within a time period (e.g., as described above in reference to FIGS. 24A-C), the devices may cycle through the reset-learn-apply algorithm. Thus, as shown in FIG. 25A, the nodes 2506a, 2506b, and 2506c may reset their usage preference tables at the reset stage. Further, as shown in FIG. 25B, the nodes 2506a, 2506b, and 2506c may learn the usage preferences of peer devices at the learn stage, and, as shown in FIG. 25C, the nodes 2506a, 2506b, and 2506c may apply any updates of the usage preferences to the channel sequence for time blocks at the apply stage.

Figure 26A:
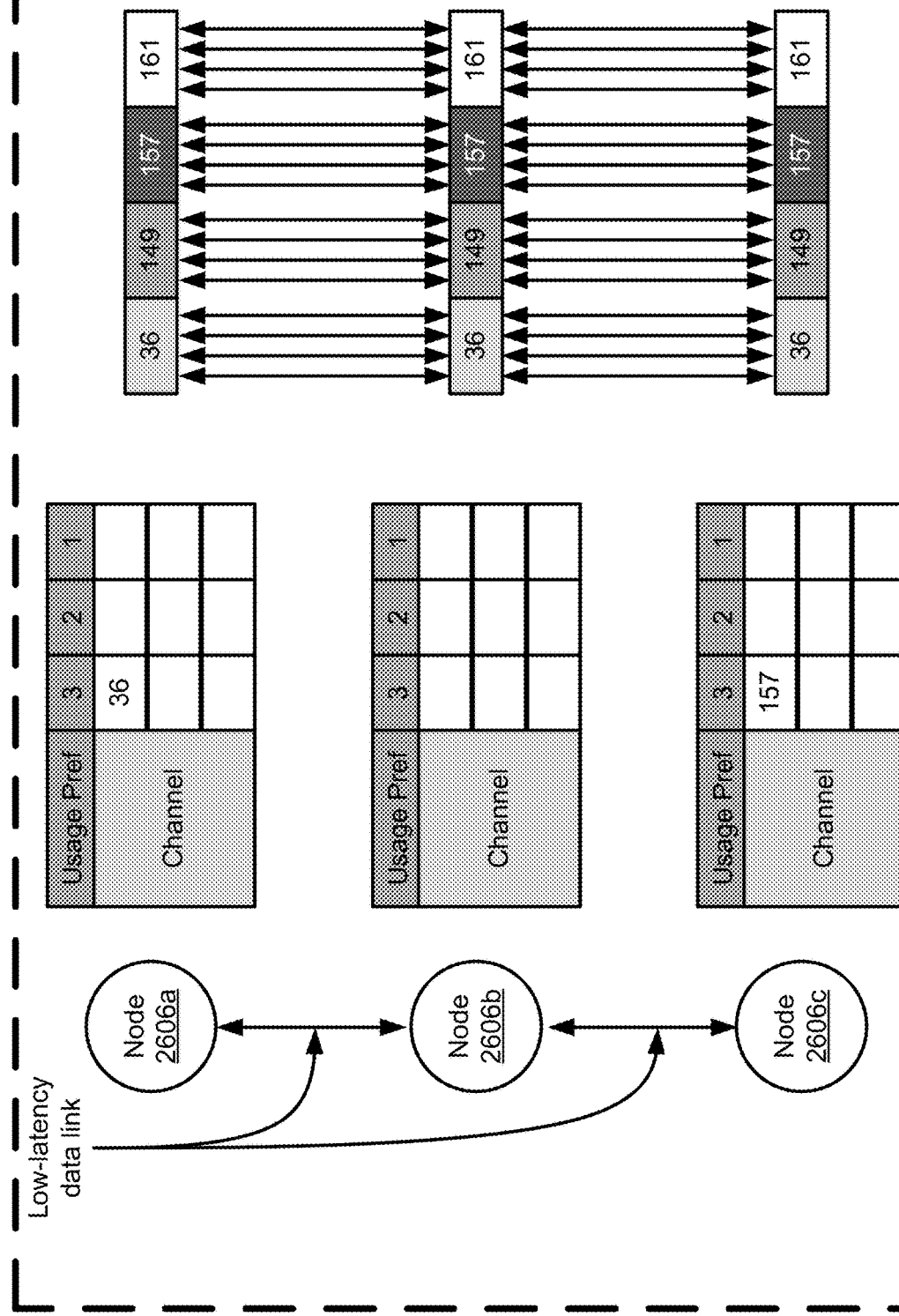
Figure 26B:
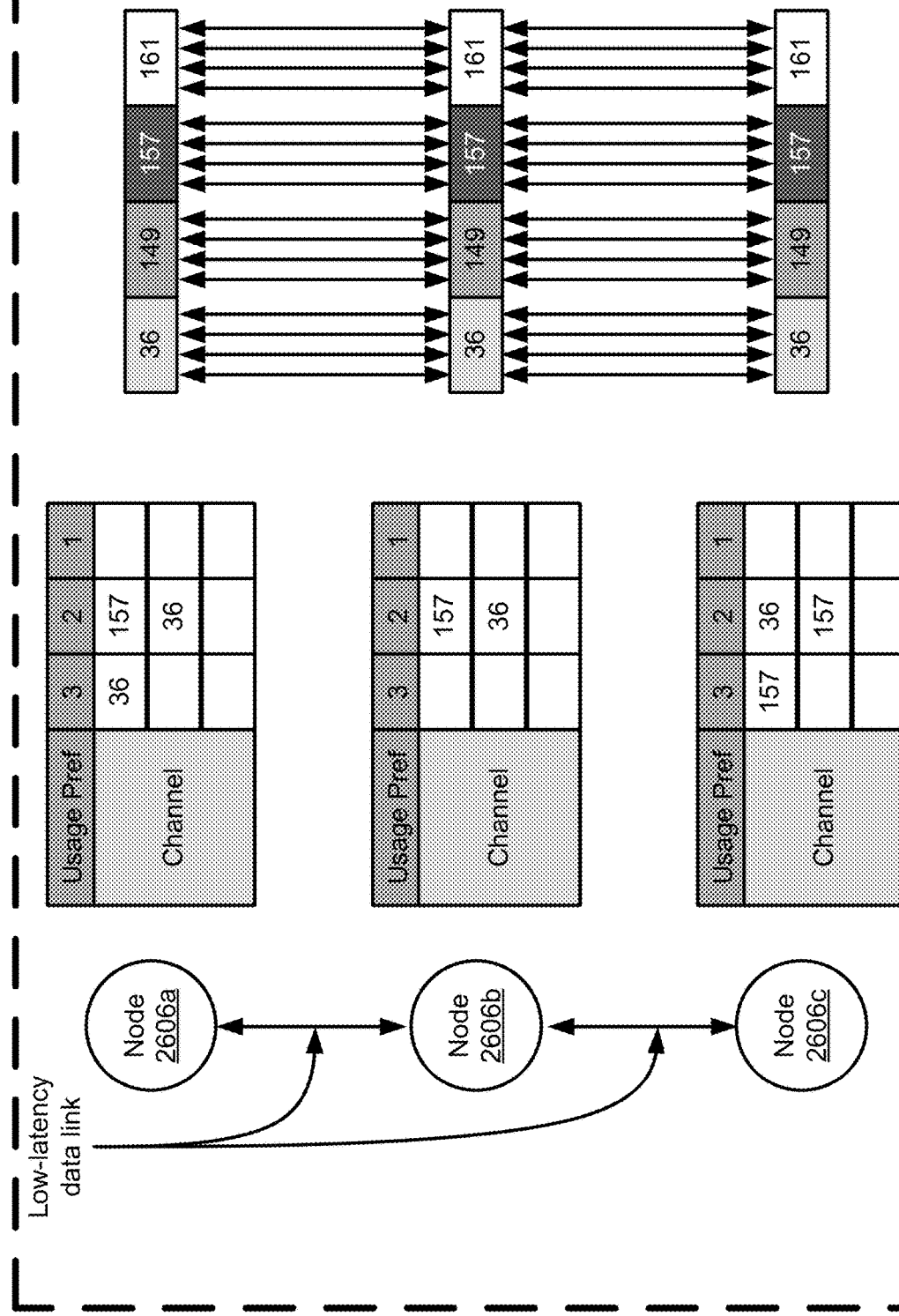
Figure 26C:
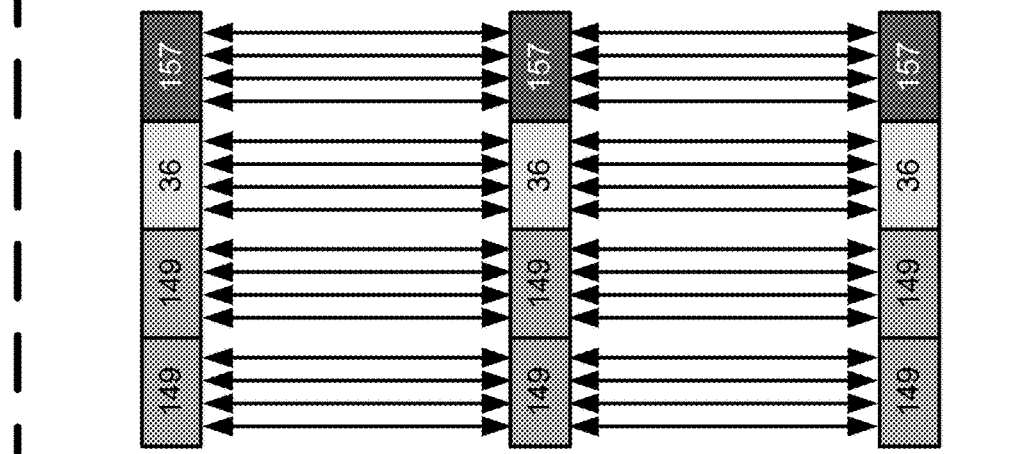
Figure 26C:
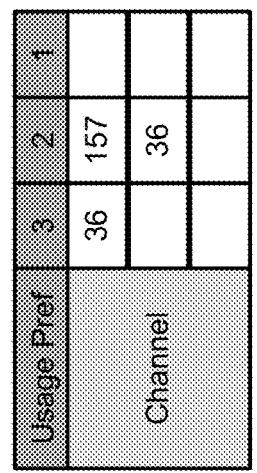
Figure 26C:
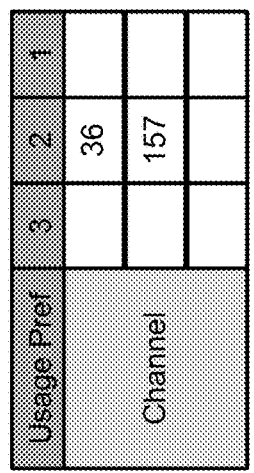
Figure 26C:
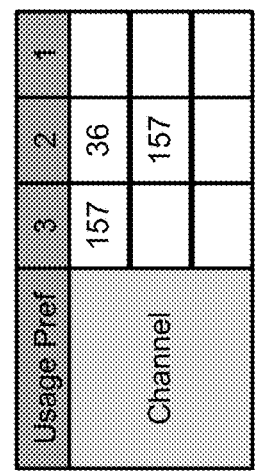
Figure 26C:
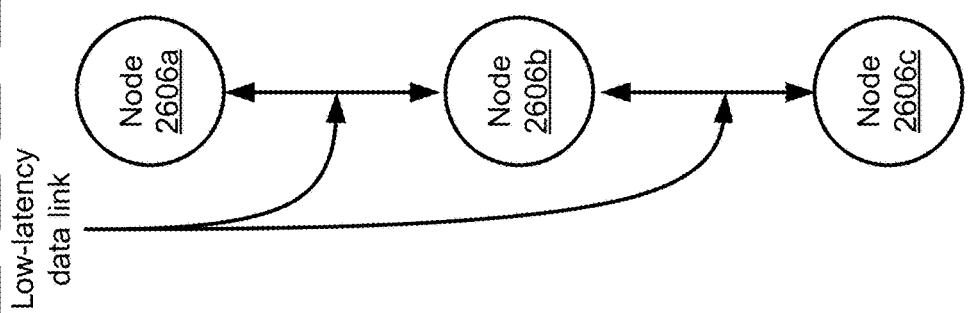

FIGS. 26A-C illustrates maintenance of the preferred channels once a channel sequence has been established and a channel preference for a peer device changes, according to some embodiments. As shown, once the devices (e.g., client stations 106) have learned and applied peer device's preferred channels to a channel sequence for time blocks within a time period (e.g., as described above in reference to FIGS.

24A-C), one of the devices (e.g., node 2606b) may disassociate with an access point, thus node 2606b's usage preference may change. As shown in FIG. 26A, the devices (e.g., nodes 2606a, 2606b, and 2606c) may reset their usage preference tables at the reset stage (including node 2606b changing its usage preference table). Further, as shown in FIG. 26B the nodes 2606a, 2606b, and 2606c may learn the usage preferences of peer devices at the learn stage (including node 2606b's change in preference). Additionally, as shown in FIG. 26C, the nodes 2606a, 2606b, and 2606c may apply any updates of the usage preferences to the channel sequence for time blocks at the apply stage.

Hence, in some embodiments, a preferred channel learning protocol may be repeated periodically to maintain and/or update usage preferences for peer devices. In some embodiments, a device (e.g., client station 106) may advertise (e.g., via a beacon and/or discovery frame) an associated access point's infrastructure channel with a highest usage preference (e.g., "3"). In addition, once a peer-to-peer data session (e.g., datapath or data link) has been established, a device may inherit a peer device's preferred channels. For example, a peer device's highest usage preference channels may be inherited as the device's next highest usage preference channels (e.g., usage preference "3" channels may be inherited as usage preference "2" channels). In addition, a peer device's next highest usage preference channels may be inherited as the device's next highest usage preference channels (e.g., usage preference "2" channels may be inherited as usage preference "2" channels). In some embodiments, if a peer-to-peer data session is terminated and the device does not have any other peer-to-peer data sessions with the peer device, the device may discontinue inheriting preferred channels from the peer device. In some embodiments, for a time period of 512 TUs (where a TU is 1024 microseconds), a device may support a maximum of three preferred channels per band for simultaneous dual band (SDB) devices excluding social channels, and a maximum of two preferred channels irrespective of band for non-SDB devices, excluding social channels. In some embodiments, lower numbered channels may be added prior a time block prior to higher numbered channels.

Figure 27:
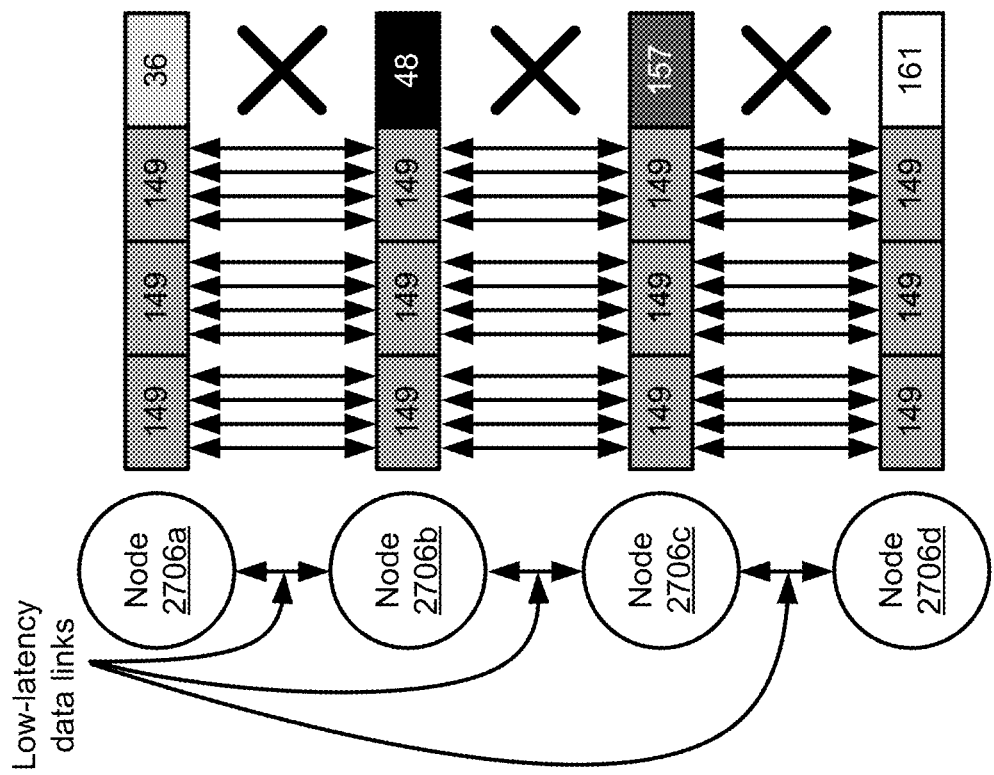
FIG. 27 illustrates an example of reducing bandwidth to accommodate visiting preferred channels, according to some embodiments.

Further, in some embodiments, for SDB devices, if there are more than the maximum number of supported preferred channels, excluding the social channel, 25 percent of the schedule may be reserved for devices to visit (tune to) their respective preferred channel with the remaining 75 percent of the schedule reserved for the social channel, thereby reducing the bandwidth for the low latency data link to 75 percent. For example, as illustrated by FIG. 27, nodes 2706a, 2706b, 2706c, and 2706d may each be associated with an access point, and, thus, may each have a highest usage preference channel (e.g., channel 36 for node 2706a, channel 48 for node 2706b, channel 157 for node 2706c, and channel 161 for node 2706d). In such instances, the devices may schedule 3 of the 4 time blocks in the time period for communication of a social channel (e.g., channel 149). Then, during the last time block of the time period, the devices may visit their highest preferred usage channel, e.g., to communicate with their associated access points. Thus, the bandwidth for the low latency data links may be reduced to 75 percent.

Figure 28:
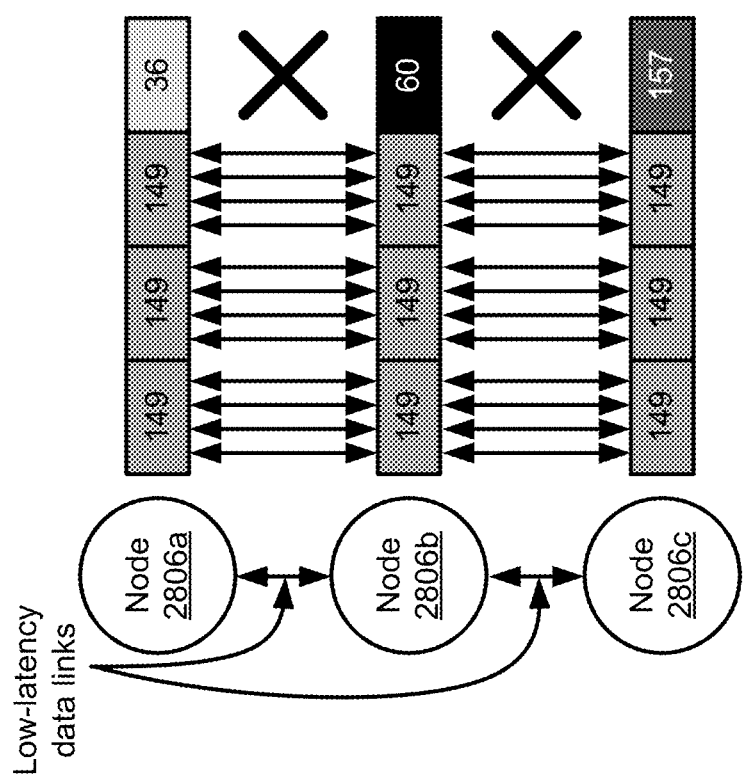
FIG. 28 illustrates an example of reducing bandwidth to accommodate a dynamic frequency selection channel, according to some embodiments.

In some embodiments, if there is a single dynamic frequency selection (DFS) channel in a data cluster, 25 percent of the schedule may be reserved for devices to visit (tune to) their respective preferred channel with the remaining 75 percent of the schedule reserved for the social channel, thereby reducing the bandwidth for the low latency data link to 75 percent. For example, as illustrated by FIG. 28, nodes 2806a, 2806b, and 2806c may each be associated with an access point, and, thus, may each have a highest usage preference channel. However, since node 2806b is associated with an access point via a DFS channel (e.g., channel 60), the devices may determine to schedule 3 of the 4 time blocks in the time period for communication of a social channel (e.g., channel 149). Then, during the last time block of the time period, the devices may visit their highest preferred usage channel, e.g., to communicate with their associated access points. Thus, the bandwidth for the low latency data links may be reduced to 75 percent.

Further Embodiments

Figure 29:
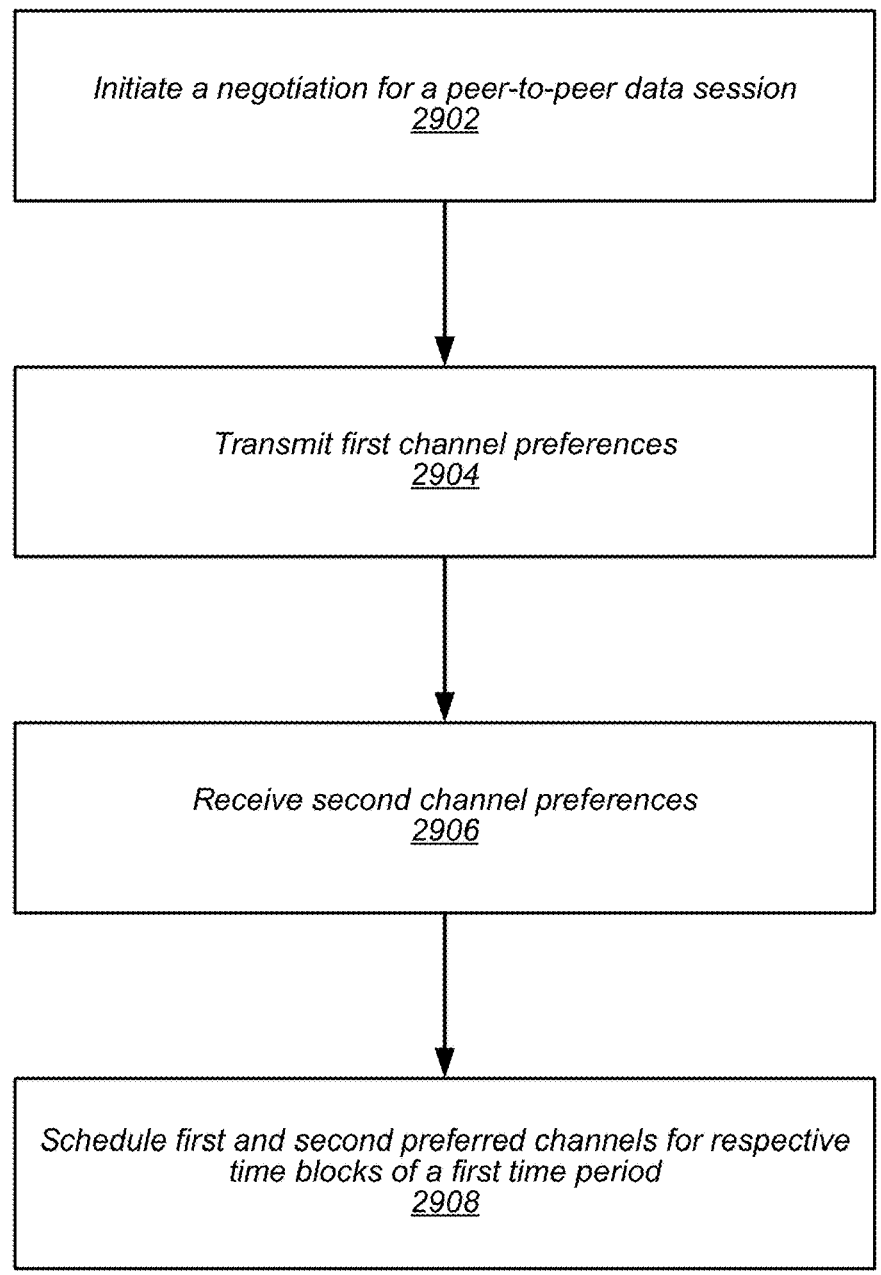
FIG. 29 illustrates a block diagram of an example of a method for adapting channel sequences based on preferred channels for a peer-to-peer data communication session, according to some embodiments.

FIG. 29 illustrates a block diagram of an example of a method for adapting channel sequences based on preferred channels for a peer-to-peer data communication session, according to some embodiments. The method shown in FIG. 29 may be used in conjunction with any of the systems or devices shown in the above Figures, among other devices. For example, a processor and/or processing element of a device shown in the above Figures may be configured to implement the method shown in FIG. 29. In various embodiments, some of the method elements shown may be performed concurrently, in a different order than shown, or may be omitted. Additional method elements may also be performed as desired. As shown, this method may operate as follows.

At 2902, a negotiation of a peer-to-peer data session may be initiated with a neighboring wireless station. In some embodiments, the peer-to-peer data session may be a Neighbor Awareness Networking (NAN) datapath. In some embodiments, wherein the peer-to-peer data session comprises a low latency data link.

At 2904, upon establishment of the peer-to-peer data session with the neighboring wireless station, first channel preferences may be transmitted (e.g., via a parameter included in a service discover frame (SDF)) to the neighboring wireless station.

At 2906, second channel preferences may be received (e.g., via a parameter included in a service discover frame (SDF)) from the neighboring wireless station. In some embodiments, the second channel preferences may further include third channel preferences of a remote neighboring device.

At 2908, a first preferred channel and a second preferred channel may be scheduled for respective time blocks of a first time period. In other words, the first preferred channel may be scheduled for a first time block of the first time period and the second preferred channel may be scheduled for a second time block of the first time period. The first time period may comprise (or included) one or more time blocks. In some embodiments, the first time period may comprise (or include) four time blocks. In some embodiments, the first preferred channel may be based, at least in part, on the first channel preferences. In some embodiments, the second preferred channel may be based, at least in part, on the second channel preferences. In some embodiments, if a channel number of the first preferred channel is lower than a channel number of the second preferred channel, the first time block may occur prior to the second time block. In some embodiments, a third preferred channel may be scheduled for a third time block of the first time period. In some embodiments, the third preferred channel may be based, at least in part, on the third channel preferences. In some embodiments, a time block may comprise (or include) eight time slots. In some embodiments, a time slot may comprise (or include) sixteen time units. In some embodiments, a time unit may comprise (or include) 1024 microseconds.

In some embodiments, a social channel may be scheduled for the first time period in an additional time block(s). In some embodiments, the first time block and the second time block may occur subsequent to the additional time block(s).

In some embodiments, a channel usage preference table may be maintained. In some embodiments, the first preferred channel may have a highest usage value and other preferred channels may have a next highest usage value. In some embodiments, after a first period of time subsequent to the scheduling, the channel usage preference table may be cleared of any preferred channels that do not have a highest usage value. In some embodiments, after clearing the channel usage preference table, updated second channel preferences may be received from the neighboring wireless station. Additionally, an updated first preferred channel and an updated second preferred channel may be scheduled for respective time blocks of a second time period. In other words, the updated first preferred channel may be scheduled for a first time block of the second time period and the updated second preferred channel may be scheduled for a second time block of the second time period.

Figure 30:
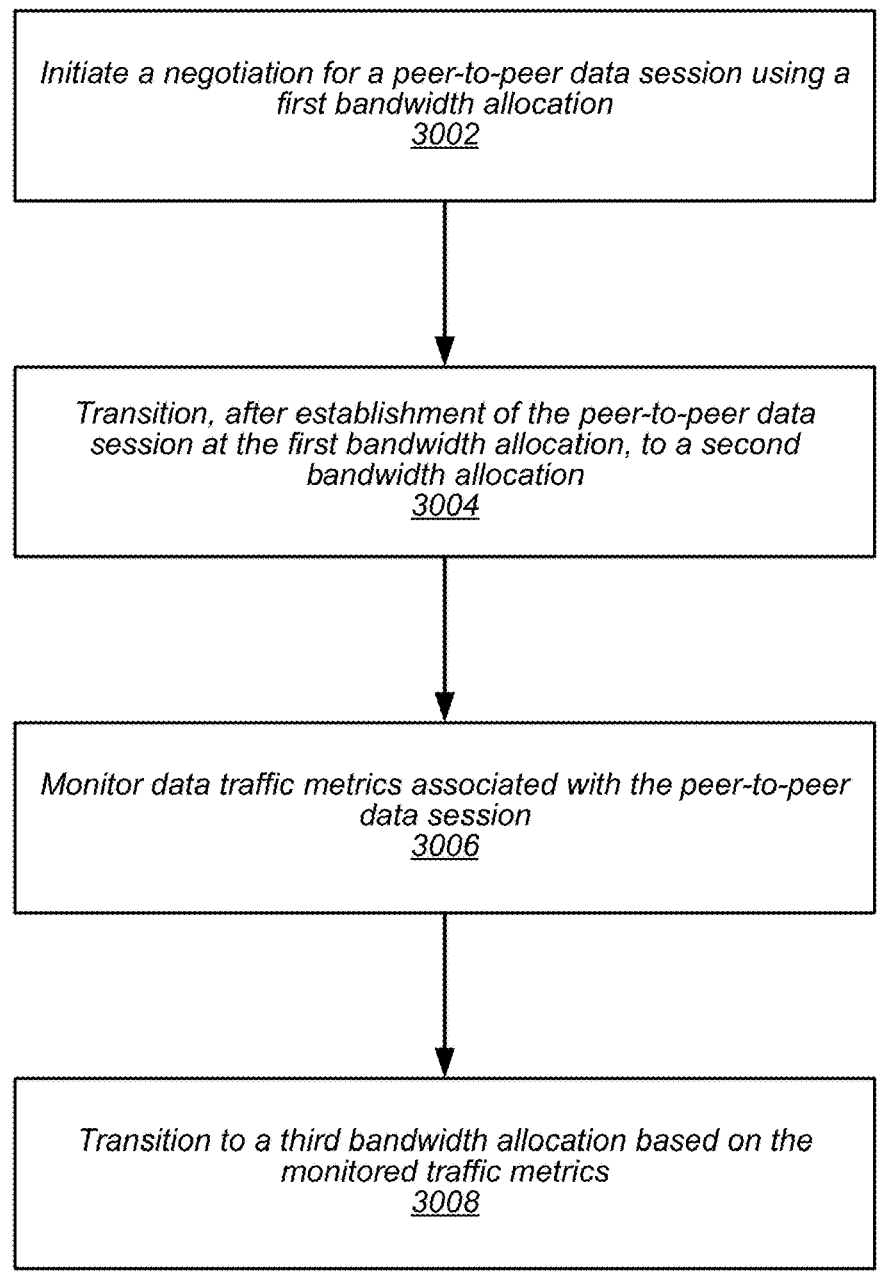
FIG. 30 illustrates a block diagram of an example of a method for adaptively allocating bandwidth for a peer-to-peer data communication session, according to some embodiments.

FIG. 30 illustrates a block diagram of an example of a method for adaptively allocating bandwidth for a peer-to-peer data communication session, according to some embodiments. The method shown in FIG. 30 may be used in conjunction with any of the systems or devices shown in the above Figures, among other devices. For example, a processor and/or processing element of a device shown in the above Figures may be configured to implement the method shown in FIG. 30. In various embodiments, some of the method elements shown may be performed concurrently, in a different order than shown, or may be omitted. Additional method elements may also be performed as desired. As shown, this method may operate as follows.

At 3002, a negotiation of a peer-to-peer data session with a neighboring wireless station using a first bandwidth allocation may be initiated. In some embodiments, the peer-to-peer data session may be a Neighbor Awareness Networking (NAN) datapath. In some embodiments, the first bandwidth allocation may comprise (or include) a twenty five percent bandwidth allocation.

At 3004, upon establishment of the peer-to-peer data session with the neighboring wireless station at the first bandwidth allocation, a second bandwidth allocation may be transitioned to. In some embodiments, the second bandwidth allocation may be based, at least in part, on a type of traffic for the peer-to-peer data session. In some embodiments, the type of traffic may comprise (or include) one of low latency data traffic or non-low latency data traffic. In some embodiments, if the type of traffic comprises (or includes) low latency data traffic, the second bandwidth allocation may comprise (or include) a one hundred percent bandwidth allocation. In some embodiments, if the type of traffic comprises (or includes) non-low latency data traffic, the second bandwidth allocation may comprise (or include) a fifty percent bandwidth allocation At 3006, data traffic metrics associated with the peer-to-peer data session may be monitored for one or more time periods. In some embodiments, the data traffic metrics may comprise (or included) one of, one or more of, and/or any combination of packet error rate, clear channel assessment, a number of received data packets, and/or a number of transmitted data packets. In some embodiments, a time period may comprise (or include) a time interval between discovery windows. In some embodiments, the time interval may comprise (or included) 8192 time units (TUs), where a TU may comprise (or include) 1024 microseconds.

At 3008, a third bandwidth allocation may be transitioned to based on the monitored data traffic metrics. For example, in some embodiments, if at least two data traffic metrics satisfy first criteria, the third bandwidth allocation may allocate less bandwidth than the second bandwidth allocation. As another example, in some embodiments, if at least one data traffic metric satisfies second criteria, the third bandwidth allocation may allocate bandwidth greater than or equal to the bandwidth allocated based on the second bandwidth allocation. In some embodiments, the first criteria may comprise (or include) the at least two data traffic metrics remaining at or below associated thresholds for more than one time period. In some embodiments, the second criteria may comprise (or include) the at least one data traffic metric remaining at or above an associated threshold for one time period.

In some embodiments, the first, second, and third bandwidth allocation may specify time slots within a time period that are allocated for the peer-to-peer data session and time slots within the time period that are not allocated for the peer-to-peer data session. In some embodiments, the time period may comprise (or include) a plurality of time blocks. In some embodiments, the time period may comprise (or include) four time blocks. In some embodiments, a time block may comprise (or include) eight time slots. In some embodiments, each time slot may comprise (or include) sixteen time units. In some embodiments, a TU may comprise (or include) 1024 microseconds.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
   at least one antenna;
   at least one radio in communication with the at least one antenna and configured to perform communications via a Wi-Fi interface; and
   at least one processor in communication with the at least one radio;
   wherein the at least one processor is configured to cause the wireless station to:
   initiate a negotiation of a peer-to-peer data session with a neighboring wireless station, wherein the peer-to-peer data session uses a first bandwidth allocation;
   upon establishment of the peer-to-peer data session with the neighboring wireless station, transition to a second bandwidth allocation for the peer-to-peer data session, wherein the second bandwidth allocation is based on a type of traffic of the peer-to-peer data session;
   monitor, for one or more time periods, data traffic metrics associated with the peer-to-peer data session; and
   transition, in response to at least two data traffic metrics satisfying first criteria, the peer-to-peer data session to a third bandwidth allocation, wherein the third bandwidth allocation allocates less bandwidth than the second bandwidth allocation.

2. The wireless station of claim 1,
   wherein the at least one processor is further configured to cause the wireless station to:
   transition, in response to at least one data traffic metric satisfying second criteria, the peer-to-peer data session to a fourth bandwidth allocation, wherein the fourth bandwidth allocation allocates bandwidth greater than or equal to the bandwidth allocated based on the second bandwidth allocation.

3. The wireless station of claim 1,
   wherein the type of traffic comprises one of low latency data traffic or non-low latency data traffic.

4. The wireless station of claim 1,
   wherein the data traffic metrics comprise one or more of:
   packet error rate;
   clear channel assessment;
   a number of received data packets; or
   a number of transmitted data packets.

5. The wireless station of claim 1,
   wherein a time period comprises a time interval between discovery windows.

6. The wireless station of claim 1,
   wherein the first criteria comprises the at least two data traffic metrics remaining at or below associated thresholds for more than one time period.

7. The wireless station of claim 1,
   wherein when the type of traffic comprises low latency data traffic, the second bandwidth allocation comprises a one hundred percent bandwidth allocation.

8. The wireless station of claim 1,
   wherein when the type of traffic comprises non-low latency data traffic, the second bandwidth allocation comprises a fifty percent bandwidth allocation.

9. The wireless station of claim 1,
   wherein the first bandwidth allocation comprises a twenty five percent bandwidth allocation.

10. An apparatus, comprising:
    a memory; and
    at least one processor in communication with the memory, wherein the at least one processor is configured to:
    transition a peer-to-peer data session established with a neighboring wireless station from a first bandwidth allocation to a second bandwidth allocation, wherein the second bandwidth allocation is based on a type of traffic of the peer-to-peer data session;
    monitor, for one or more time periods, data traffic metrics associated with the peer-to-peer data session; and
    wherein, when at least two data traffic metrics satisfy first criteria, the at least one processor is configured to transition the peer-to-peer data session to a third bandwidth allocation, wherein the third bandwidth allocation allocates less bandwidth than the second bandwidth allocation; and
    wherein, when at least one data traffic metric satisfies second criteria, the at least one processor is configured to transition the peer-to-peer data session to a fourth bandwidth allocation, wherein the fourth bandwidth allocation allocates bandwidth greater than or equal to the bandwidth allocated based on the second bandwidth allocation.

11. The apparatus of claim 10,
    wherein the first criteria comprises the at least two data traffic metrics remaining at or below associated thresholds for more than one time period, and wherein the second criteria comprises the at least one data traffic metric remaining at or above an associated threshold for one time period.

12. The apparatus of claim 10,
    wherein the first, second, and third bandwidth allocation specify time slots within a time period that are allocated for the peer-to-peer data session and time slots within the time period that are not allocated for the peer-to-peer data session.

13. The apparatus of claim 12,
    wherein the time period comprises a plurality of time blocks, wherein a time block comprises eight time slots, and wherein a time slot comprises sixteen time units.

14. The apparatus of claim 13,
    wherein the peer-to-peer data session is a Neighbor Awareness Networking (NAN) datapath, wherein the time period comprises four time blocks, and wherein a time unit comprises 1024 microseconds.

15. The apparatus of claim 10,
    wherein when the type of traffic comprises low latency data traffic, the second bandwidth allocation comprises a one hundred percent bandwidth allocation; and
    wherein when the type of traffic comprises non-low latency data traffic, the second bandwidth allocation comprises a fifty percent bandwidth allocation.

16. A non-transitory computer readable memory medium storing program instructions executable by processing circuitry to cause a wireless station to:
    transition a peer-to-peer data session established with a neighboring wireless station from a first bandwidth allocation to a second bandwidth allocation, wherein the second bandwidth allocation is based on a type of traffic of the peer-to-peer data session;
    monitor, for one or more time periods, data traffic metrics associated with the peer-to-peer data session; and transition, in response to at least one data traffic metric satisfying second criteria, the peer-to-peer data session to a fourth bandwidth allocation, wherein the fourth bandwidth allocation allocates bandwidth greater than or equal to the bandwidth allocated based on the second bandwidth allocation.

17. The non-transitory computer readable memory medium of claim 16, wherein the program instructions are further executable to cause the wireless station to:

transition, in response to at least two data traffic metrics satisfying first criteria, the peer-to-peer data session to a third bandwidth allocation, wherein the third bandwidth allocation allocates less bandwidth than the second bandwidth allocation, wherein the first criteria comprises the at least two data traffic metrics remaining at or below associated thresholds for more than one time period.

18. The non-transitory computer readable memory medium of claim 16, wherein the second criteria comprises the at least one data traffic metric remaining at or above an associated threshold for one time period.

19. The non-transitory computer readable memory medium of claim 16, wherein when the type of traffic comprises low latency data traffic, the second bandwidth allocation comprises a one hundred percent bandwidth allocation; and wherein when the type of traffic comprises non-low latency data traffic, the second bandwidth allocation comprises a fifty percent bandwidth allocation.

20. The non-transitory computer readable memory medium of claim 16, wherein the first, second, and fourth bandwidth allocation specify time slots within a time period that are allocated for the peer-to-peer data session and time slots within the time period that are not allocated for the peer-to-peer data session.

\* \* \* \* \*